US012574658B2

(12) United States Patent
Kobayashi

(10) Patent No.: US 12,574,658 B2
(45) Date of Patent: Mar. 10, 2026

(54) MOVING IMAGE NOISE REDUCTION APPARATUS AND MOVING IMAGE NOISE REDUCTION METHOD

(71) Applicant: JVCKENWOOD Corporation, Yokohama (JP)

(72) Inventor: Toshihide Kobayashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 111 days.

(21) Appl. No.: 18/664,365

(22) Filed: May 15, 2024

(65) Prior Publication Data

US 2024/0406594 A1     Dec. 5, 2024

(30) Foreign Application Priority Data

May 16, 2023     (JP) ................................ 2023-080527

(51) Int. Cl.
*H04N 25/626*          (2023.01)
*G06T 7/246*           (2017.01)
*H04N 25/47*           (2023.01)

(52) U.S. Cl.
CPC ........... *H04N 25/626* (2023.01); *G06T 7/246* (2017.01); *H04N 25/47* (2023.01)

(58) Field of Classification Search
CPC .......... G06T 2207/20182; G06T 7/246; H04N 25/47; H04N 25/626
See application file for complete search history.

(56) References Cited

U.S. PATENT DOCUMENTS

| | | | | |
|---|---|---|---|---|
| 12,439,008 B2* | 10/2025 | Arnaud | ................ | H04N 23/611 |
| 2001/0010705 A1* | 8/2001 | Min | ........................ | H04N 19/61 |
| | | | | 375/E7.036 |
| 2013/0034271 A1* | 2/2013 | Sakaguchi | ............ | G06T 3/4053 |
| | | | | 382/107 |
| 2015/0279006 A1* | 10/2015 | Choi | ....................... | G06T 7/223 |
| | | | | 382/264 |
| 2022/0148432 A1* | 5/2022 | Nakagawa | ........... | H04N 23/634 |
| 2023/0025778 A1* | 1/2023 | Shoa Hassani Lashdan | ............... | |
| | | | | H04N 19/139 |

FOREIGN PATENT DOCUMENTS

JP          2021508975 A      3/2021

* cited by examiner

*Primary Examiner* — Antoinette T Spinks
(74) *Attorney, Agent, or Firm* — Shih IP Law Group, PLLC

(57)          ABSTRACT

A filter unit decomposes image data from an image sensor adapted to capture images at a predetermined frame rate into a low-frequency component and a first high-frequency component. A motion vector estimation unit reads data from an event sensor, adapted to asynchronously output information on a pixel in which a brightness changes, at a frame rate higher than the predetermined frame rate and estimates a motion vector. A motion compensation unit performs motion compensation based on the motion vector. The filter unit generates a third high-frequency component by adding the first high-frequency component and a second high-frequency component extracted from an image obtained by motion compensation at a predetermined ratio, and reduces a noise in the image data by adding the low-frequency component and the third high-frequency component.

5 Claims, 31 Drawing Sheets

MOVING IMAGE NOISE REDUCTION APPARATUS AND MOVING IMAGE NOISE REDUCTION METHOD

CROSS REFERENCE TO RELATED APPLICATION

This application claims the benefit of priority from the prior Japanese Patent Application No. 2023-80527, filed on May 16, 2023, the entire content of which is incorporated herein by reference.

BACKGROUND

1. Technical Field

The present disclosure relates to a moving image noise reduction apparatus and a moving image noise reduction method.

2. Description of the Related Art

The related art addresses reduction of noise in captured moving images by simply adding up several video frames between frames, dividing the sum by the number of frames to calculate an average, thereby reducing the random noise. Averaging is performed by using moving average whereby the segment of frames, in which an average is calculated, is updated frame by frame. In this case, a blur occurs in a moving subject, and so there is a problem in that noisy blur is produced in the image obtained by averaging. When a distance of a stationary object is precisely measured by a TOF (Time Of Flight) sensor, on the other hand, there is no problem of blurring so that this noise suppression method is effective. The larger the number of frames averaged, the greater the advantage, and so the method is often used for noise suppression in a distance measurement camera.

A high-speed, low-latency event-based vision sensor (EVS (Event-based Vision Sensor) (also called an "event-based sensor") that asynchronously detects a brightness change in pixels in an image and outputs the coordinates of a pixel with a brightness change along with time information has been developed. Patent Literature 1 discloses a technology for processing signals generated by an asynchronous event-based sensor.

[Patent Literature 1] JP2021-508975

In order to improve the accuracy of noise reduction in moving images, it is necessary to capture the motion of a subject at a high frame rate in blurry moving images, estimate a motion vector with high accuracy, and perform noise reduction using motion-compensated images. Patent Literature 1 does not disclose a technology of acquiring motion information on an image using an event-based sensor. The document teaches estimating a generation rate from asynchronous data output from an event-based sensor but does not disclose a method to increase the speed of reading from and writing in a memory, which is necessary to adapt the generation rate to the high frame rate.

SUMMARY

A moving image noise reduction apparatus according to an embodiment of the present disclosure includes: a filter unit that decomposes image data from an image sensor adapted to capture images at a predetermined frame rate into a low-frequency component and a first high-frequency component; a motion vector estimation unit that reads data from an event sensor, adapted to asynchronously output information on a pixel in which a brightness changes, at a frame rate higher than the predetermined frame rate and estimates a motion vector; and a motion compensation unit that performs motion compensation based on the motion vector. The filter unit generates a third high-frequency component by adding the first high-frequency component and a second high-frequency component extracted from an image obtained by motion compensation at a predetermined ratio, and reduces a noise in the image data by adding the low-frequency component and the third high-frequency component.

Another embodiment of the present disclosure relates to a moving image noise reduction method. The method includes: filtering image data from an image sensor adapted to capture images at a predetermined frame rate into a low-frequency component and a first high-frequency component; reading data from an event sensor, adapted to asynchronously output information on a pixel in which a brightness changes, at a frame rate higher than the predetermined frame rate and estimating a motion vector; and performing motion compensation based on the motion vector The filtering generates a third high-frequency component by adding the first high-frequency component to a second high-frequency component extracted from an image obtained by motion compensation at a predetermined ratio, and reduces a noise in the image data by adding the low-frequency component and the third high-frequency component.

Optional combinations of the aforementioned constituting elements, and implementations of the present disclosure in the form of methods, apparatuses, systems, recording mediums, and computer programs may also be practiced as additional embodiments of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 3 shows a basic configuration diagram of a moving image noise reduction apparatus of embodiment 1;

FIG. 11A is a diagram showing vertical coefficients and peripheral coefficients for the respective pixels in an image block;

FIG. 11B shows weighting coefficients for the amount of vertical motion of respective pixels in the image block;

FIG. 13B shows weighting coefficients for the amount of horizontal motion of the respective pixels in an image block;

DETAILED DESCRIPTION

The invention will now be described by reference to the preferred embodiments. This does not intend to limit the scope of the present invention, but to exemplify the invention.

Embodiment 1

In embodiment 1, a configuration will be described in which the motion of a subject is captured at a high frame rate by using output data of an EVS, a motion vector is estimated with high accuracy, and noise reduction is performed using the motion-compensated image.

In this embodiment, an RGB sensor acquires R, G, B data of an image, and, at the same time, an event-based sensor (EVS) acquires data for brightness change in the image. A motion vector is computed within one frame of the RGB sensor by using the brightness change data to perform motion compensation. Noise reduction according to frame-to-frame moving average is performed by using the motion-compensated image.

Figure 1:
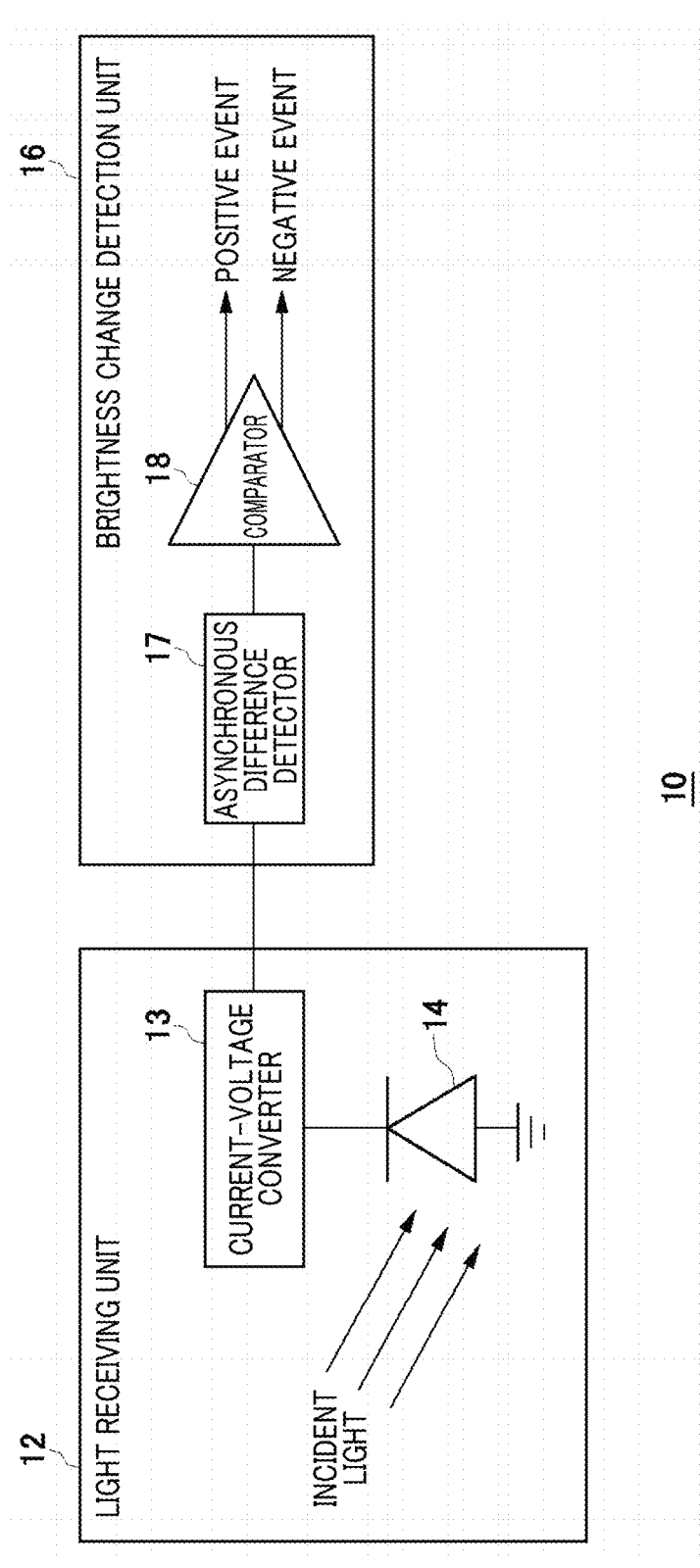
FIG. 1 shows a configuration diagram of an event-based sensor.

FIG. 1 shows a configuration diagram of an EVS 10. The EVS 10 includes a light receiving unit 12 and a brightness change detection unit 16. The light receiving unit 12 includes a current-voltage converter 13 and a photodiode 14. The brightness change detection unit 16 includes an asynchronous difference detector 17 and a comparator 18.

In the light receiving unit 12, the photodiode 14 converts an incident light into a current pixel by pixel and gives the current to the current-voltage converter 13. The current-voltage converter 13 converts the current detected in each pixel into a voltage and gives the voltage to the brightness change detection unit 16.

In the brightness change detection unit 16, the asynchronous difference detector 17 asynchronously detects a difference between the detected voltage of each pixel and the reference voltage and gives the difference to the comparator 18. The comparator 18 outputs a positive event signal when the voltage difference exceeds a positive threshold value, outputs a negative event signal when a negative threshold value is exceeded, and otherwise outputs zero.

In this way, the EVS10 converts the light detected pixel by pixel into a voltage, compares the voltage derived from the conversion with threshold levels, in which a desired width and voltage levels are set (hereinafter simply referred to as "thresh levels"). When the light is brighter than the positive thresh level, the EVS10 sets 1 in the positive event signal, and, when the light is darker than the negative thresh level, the EVS10 sets 1 in the negative event signal, and otherwise output both signals at 0. When either the positive or negative thresh level is exceeded, the voltage level of the reference thresh level is re-set to the voltage level at that time. When both are at 0, the data for that pixel is not output. When the signals are at 0, nothing is output. Therefore, one item of data indicating a polarity need only be output for a pixel with a brightness change of the threshold level width. That is, 1-bit data is output. In addition, data indicating the address position of the output in the x and y coordinates of the screen is also output.

Figures 2A, 2B, 2C:
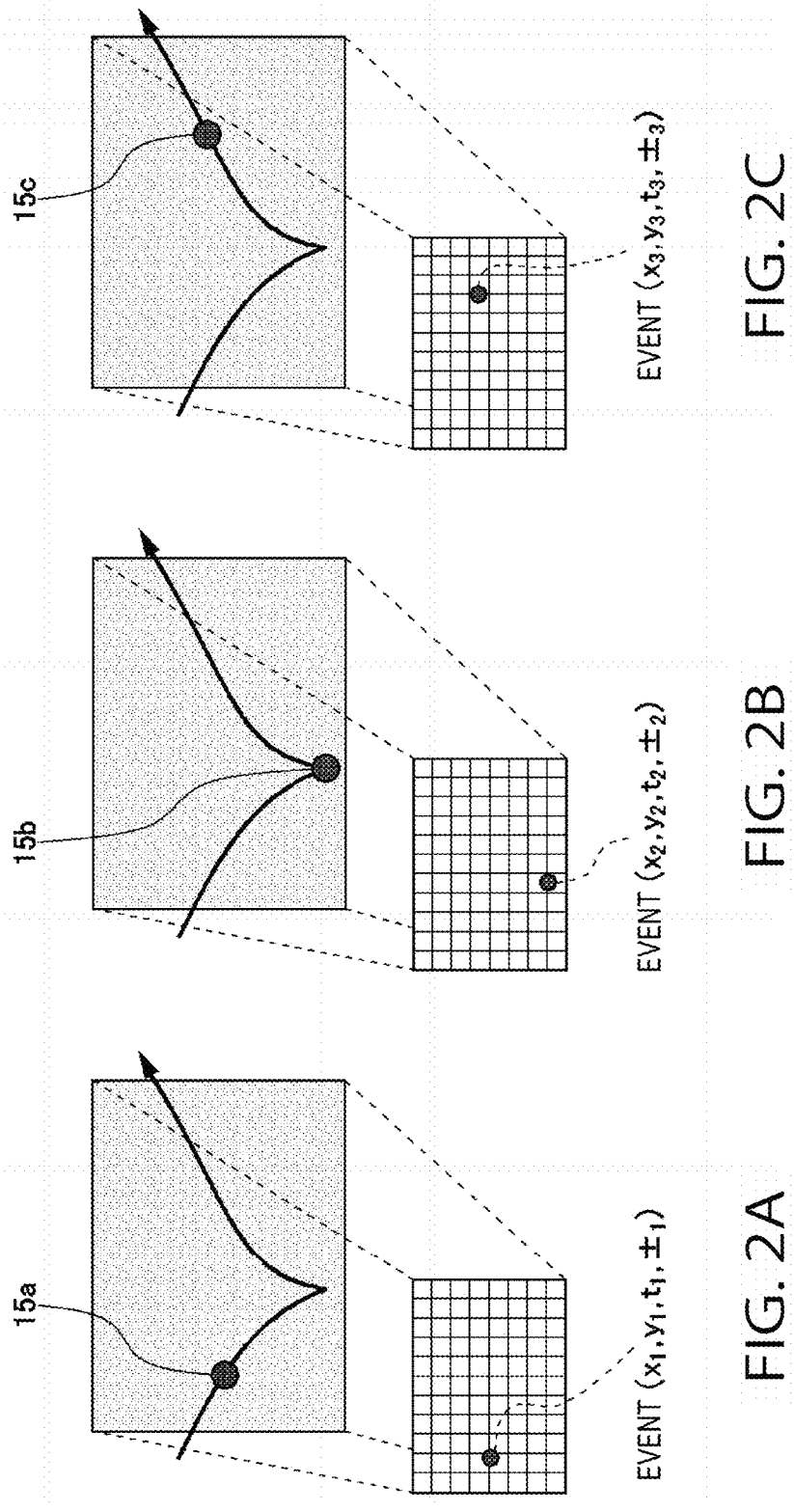
FIGS. 2A-2C are diagrams showing an event signal output by the event-based sensor.

FIGS. 2A-2C are diagrams showing event signals output by the EVS 10. It will be assumed that a subject moves along the arrow in the figure. In FIG. 2A, the brightness of the pixel at the position of a reference numeral 15*a* exceeds a threshold value, and an event signal (x1, y1, t1, ±1) including the coordinates of the pixel, the time, and the light/dark polarity is output. In FIG. 2B, the brightness of the pixel at the position of a reference numeral 15*b* exceeds the threshold value, and an event signal (x2, y2, t2, ±2) including the coordinates of the pixel, the time, and the light/dark polarity is output. In FIG. 2C, the brightness of the pixel at the position of a reference numeral 15*c* exceeds the threshold value, and an event signal (x3, y3, t3, ±3) including the coordinates of the pixel, the time, and the light/polarity is output.

In this way, the EVS10 does not output, for each pixel, multiple bits such as 12-bit A/D data of a normal sensor but only output data for a pixel with a brightness change at a point of time when the threshold level is exceeded. Therefore, the EVS 10 can output an event signal asynchronously on the order of microseconds at a very high rate. This embodiment uses output data of the EVS10 capable of detecting a brightness change at a high speed in this way.

Figure 3:
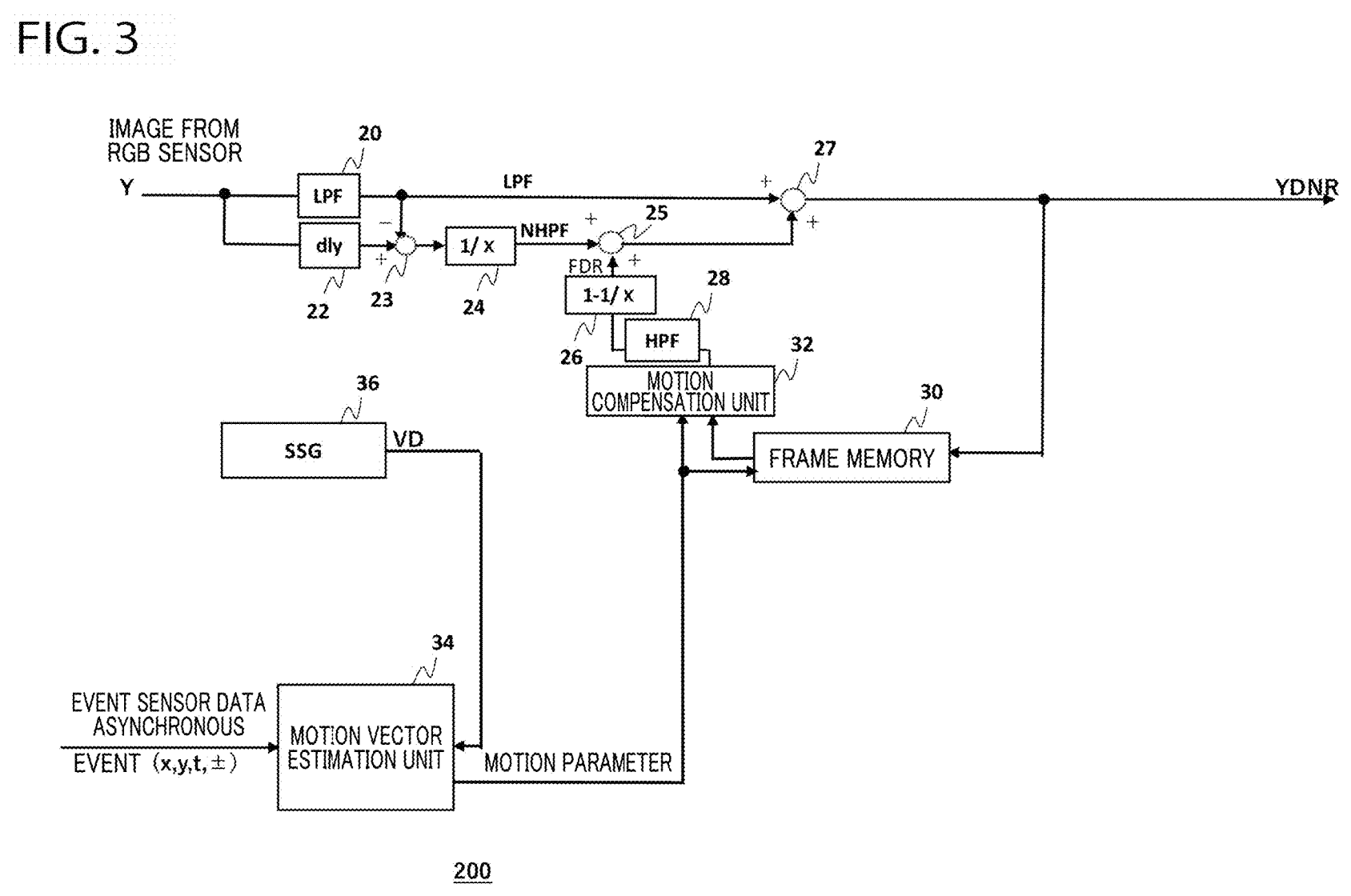

FIG. 3 shows a basic configuration diagram of a moving image noise reduction apparatus 200 of embodiment 1.

A RAW signal acquired from an RGB sensor such as a camera is subjected to a camera process to be turned into R, G, B or Y, Cb, Cr data for moving images and is input to the moving image noise reduction apparatus 200. Alternatively, each of the R, Gr, Gb, B signals of a BAYER pattern may be input to the moving image noise reduction apparatus 200. Further, a distance measurement image output from information obtained from a TOF sensor may be input to the moving image noise reduction apparatus 200. For ease of understanding, an example in which a Y signal is input will be described. The input Y signal is input to a low pass filter (LPF (Low Pass Filter)) unit 20.

The LPF unit 20 includes, for example, a horizontal low-pass filter such as $0.25Z^{\wedge}(-2)+0.5\ Z^{\wedge}(-1)+0.25Z^{\wedge}0$, wherein Z denotes the scan time for 1 pixel. Further, the LPF unit 20 includes a vertical low-pass filter such as, for example, $0.25L^{\wedge}(-2)+0.5L^{\wedge}(-1)+0.25L0$, where L denotes the scan time for one line.

The Y signal is simultaneously delayed in a dly (delay) circuit 22. A subtraction unit 23 combines the LPF output and the delay amount and subtracts the LPF signal from the Y signal to obtain a high frequency signal. This high frequency signal is divided by a coefficient X in a division unit 24. X denotes a gain adjustment for frame-to-frame moving averaging, and X is used to adjust the amount of noise reduction. The addition unit 25 adds the high-frequency signal NHPF multiplied by 1/X and the feedback high-frequency signal FDR delayed by one frame and motion-compensated as described later. The addition unit 27 adds the result of this addition to the output result of the LPF unit 20 described above to obtain a YDNR signal in which the noise is reduced by moving averaging across frames. The YDNR signal is simultaneously stored in the frame memory 30.

The motion vector estimation unit 34 calculates and predicts the motion vector of a moving subject from the data of the EVS 10 and gives the motion vector to the motion compensation unit 32. The motion compensation unit 32 compensates, according to the motion vector, for motion by shifting each block by the amount defined by the motion vector so as to generate a prediction image.

Figure 4:
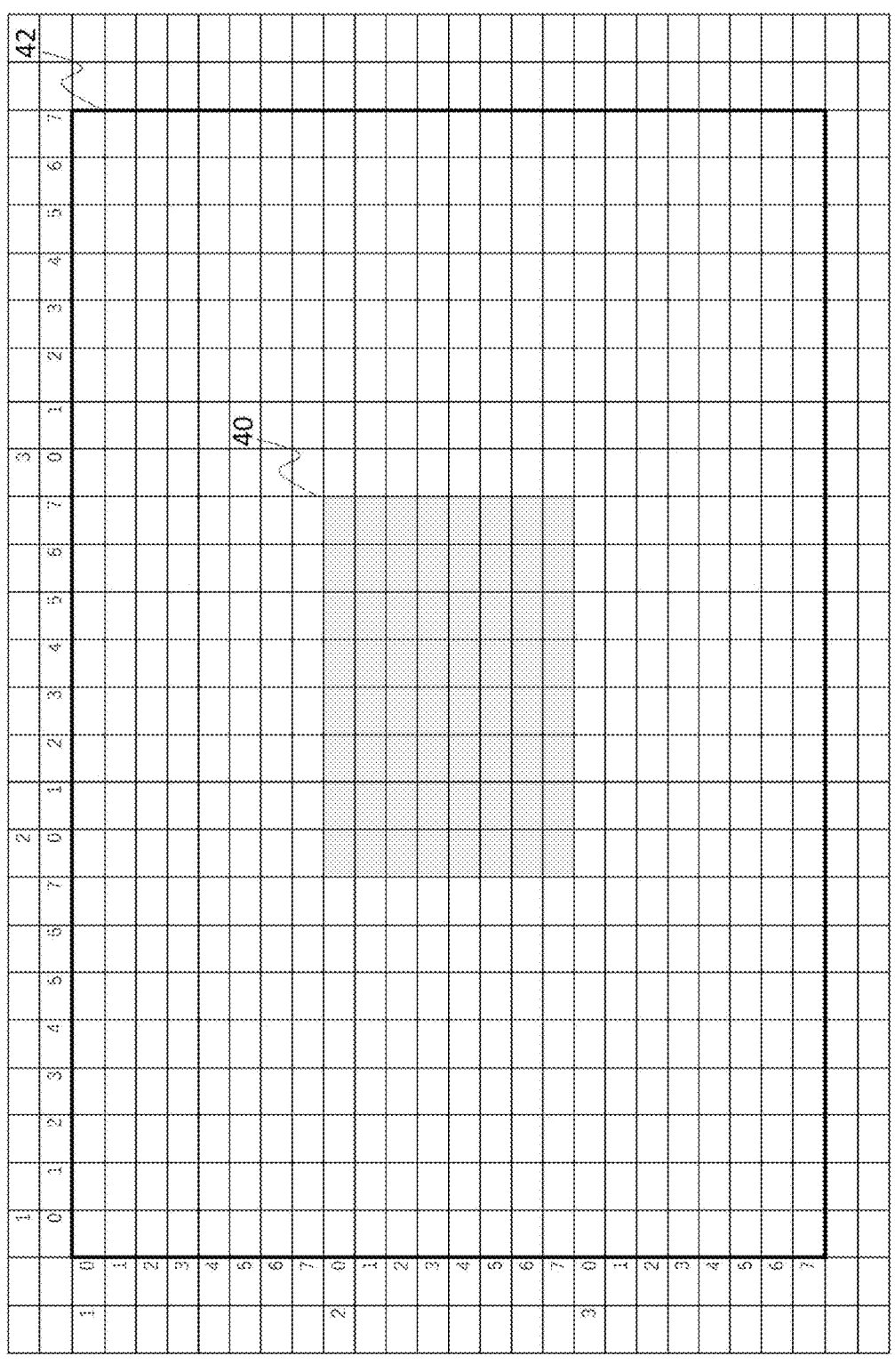
FIG. 4 is a diagram showing a block range used for motion vector estimation.

The motion vector estimation unit 34 determines a search start point and performs motion search described later. FIG. 4 is a diagram showing a block range used for motion vector estimation. In this example, as shown in FIG. 4, a motion vector estimation block range 42 wider than a motion compensation target block range 40 is defined. In the example of FIG. 4, the motion compensation target block range 40 is set to 8×8, and the motion vector estimation block range 42 is set to 24×24.

Figure 5:
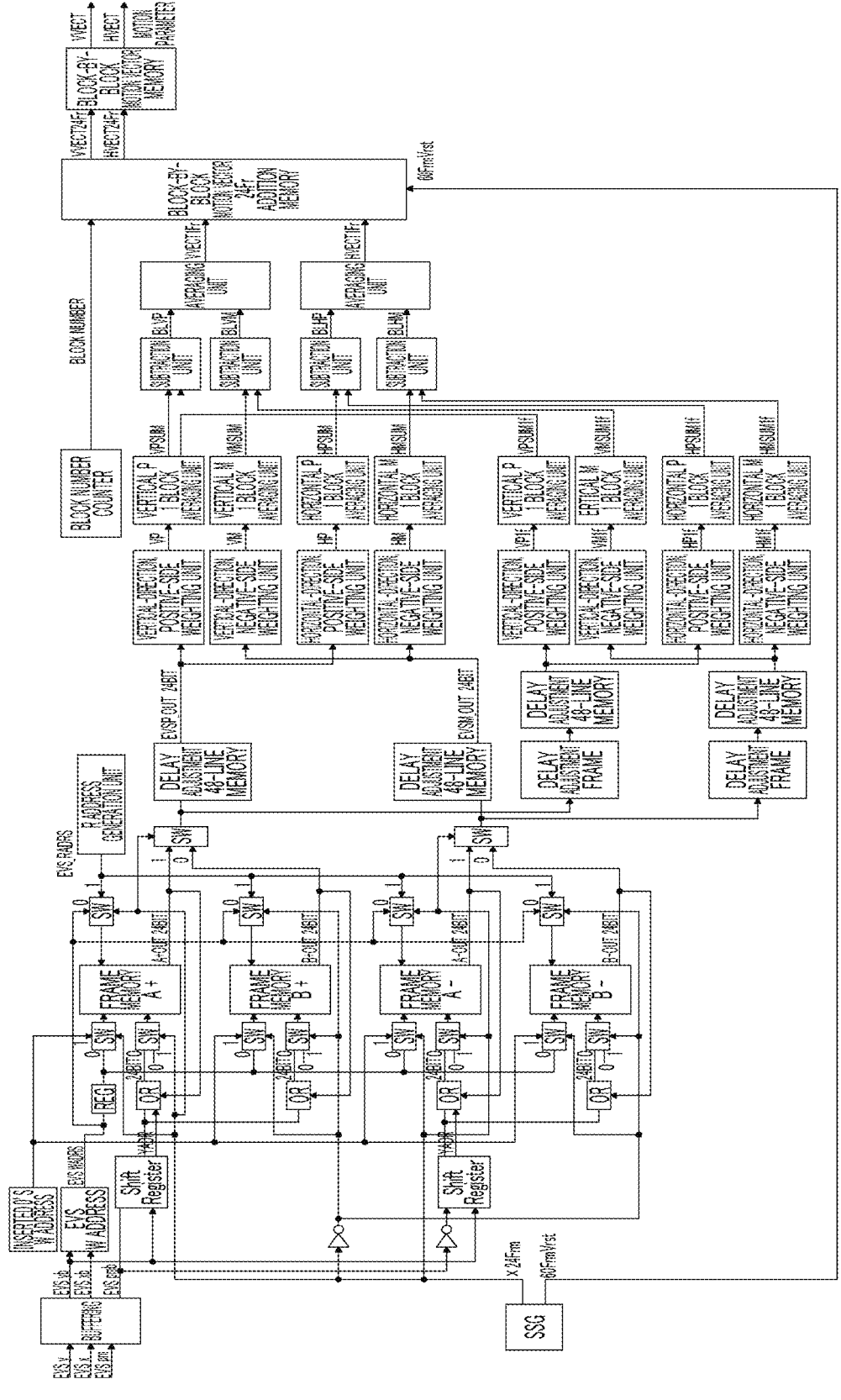
FIG. 5 is a block diagram of the motion vector estimation unit.

FIG. 5 is a block diagram of the motion vector estimation unit 34. The motion vector estimation unit 34 reads a motion vector at a time interval for camera synchronization.

The y-coordinate EVS_y and the x-coordinate EVS_x indicating the coordinate address of a pixel with a brightness/darkness change beyond the threshold level, and a bright/dark sign EVS_pm are input from the EVS to a buffering block according to an asynchronous timing schedule. The buffering block is a memory for replacing the asynchronously input EVS signal with an internal clock and absorbing the processing delay inside the block. For example, a FIFO memory is used.

A write address EVS_WADRS in a frame memory A+, a frame memory B+, a frame memory A−, and a frame memory B− for temporarily storing the bright/dark sign in these memories are created from buffering outputs EVS_yb, EVS_xb. The frame memory A+ and the frame memory B+ are memories for storing pixels in which the EVS output has changed in the brighter direction during a desired period described later. The frame memory A− and the frame memory B− are memories for storing pixels in which the EVS output has changed in the darker direction during a desired period described later.

Given that the RGB sensor is operating at a frame rate of, for example, 1/60 seconds, the EVS outputs data asynchronously on the order of microseconds at the maximum. Data is read out from these frame memories at a desired period for updates to ensure that synchronization with the data of the RGB sensor. Therefore, the EVS data is stored in memory areas in these frame memories corresponding to the addresses. For example, data with a period 1/24 times that of RGB data is retrieved from the frame memory by reading with a period 1/24 times the period of the RGB sensor to update the output data. This 1/24-fold period is a period that is convenient for division of a block of 24×24 pixels of FIG. 4 in terms of circuit configuration. However, the period may be changed to a desired period depending on pixels resulting from block division or frame memory configuration. For ease of understanding, the period 1/24 times that of RGB will be described.

Since the period is 1/24 times the period of the RGB sensor, it is necessary to perform a very high-speed process. This is difficult to realize in an ordinary FPGA hardware configuration due to constraints on processing speed. In this embodiment, therefore, the following measures are taken to realize it.

Figure 6:
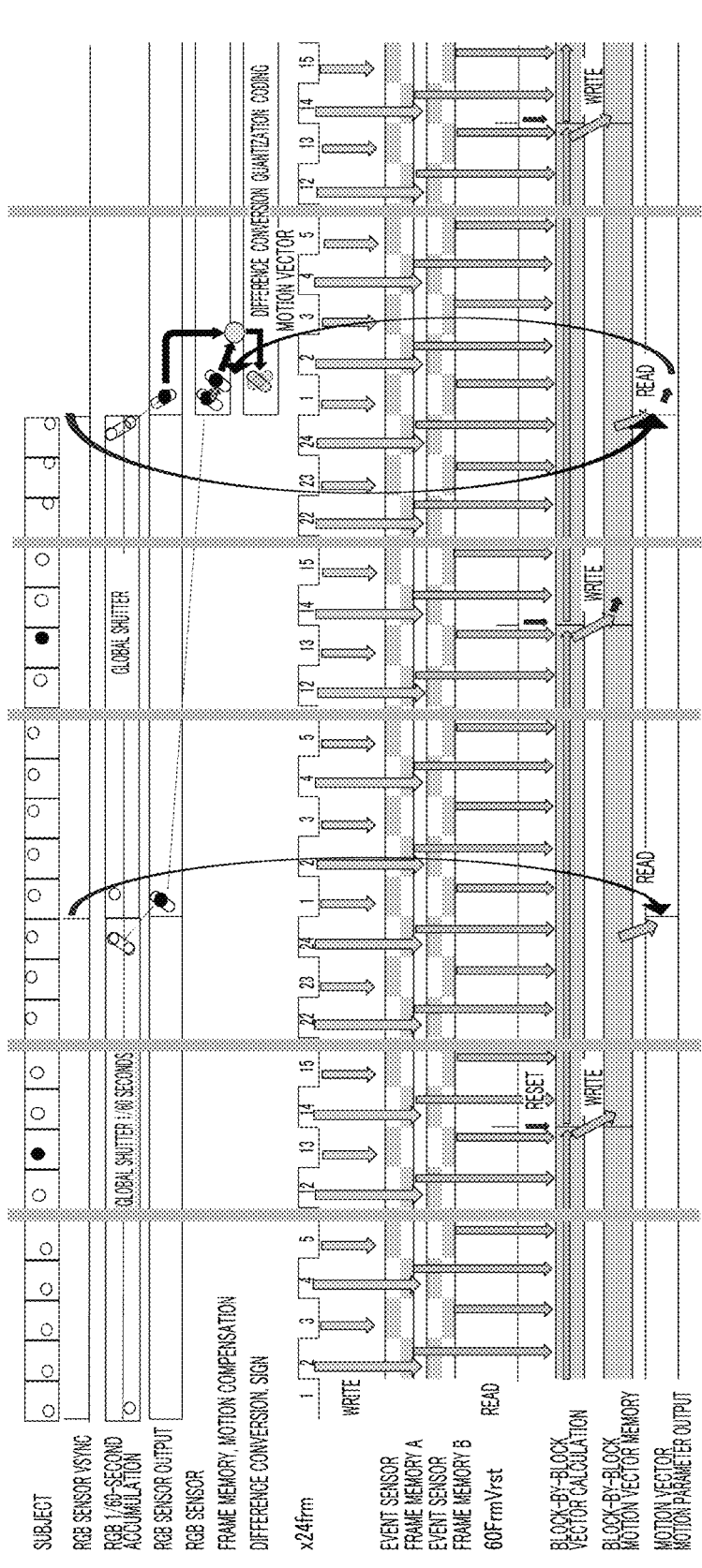
FIG. 6 is a timing chart showing the operation of the motion vector estimation unit.

FIG. 6 is a timing chart showing the operation of the motion vector estimation unit 34. SSG of FIG. 5 generates an x24frm pulse with a period 1/24 times the period of the RGB sensor. The RGB sensor VSYNC of FIG. 6 goes HIGH once in every 1/60-second period. On the other hand, the x24frm signal is a pulse that repeats, as shown in FIG. 6, HIGH and LOW with a 1/1440-second period, which 1/24 times the RGB period. The frame memory A+ and the frame memory B+, which store pixels that have changed in a brighter direction, operate such that one of the memories writes EVS data while the other reads out EVS data and writes 0 in synchronization with HIGH and LOW of x24frm. Similarly, the frame memory A− and the frame memory B−, which store pixels that have changed in a darker direction, operate such that one of the memories writes EVS data while the other reads out EVS data and writes 0 in synchronization with HIGH and LOW of x24frm.

As shown in FIG. 6, the frame memory A+ and the frame memory A− write in an address corresponding to the brightness sign of the sensor when x24frm is low and read the written data sequentially from address 0 at the top of the screen when x24frm is HIGH. Normally, it is necessary to read at a clock speed 24 times that of the RGB signal in order to read one pixel at a time from the memory. By focusing on the fact that brightness data of EVS includes 1 bit, it is ensured that 24 lines are read at a time by handling 24 lines as 24-bit data. This makes it possible to read at a speed equivalent to the clock speed handled in normal RGB. The method of turning data into 24 bits is shown below.

When the pixel size of the EVS is, for example, 1280 (x-axis)×720 (y-axis), the EVS_yb is represented by EVS_yb [9:0] in 10 BIT, the EVS_xb by by EVS_xb [10:0] in 11 BIT. The write address EVS_WADRS at that time is determined by the following expression given that the motion vector estimation block range is 24×24.

$$EVS\_WARDS = INT(EVS\_yb/24) \times 2 \wedge 11 + EVS\_xb \qquad (1)$$

EVS_pm is input at 1 when the pixel becomes brighter and at 0 when the pixel becomes darker. EVS_pm read according to the clock inside the block through the buffer is defined as EVS_pmb. BITSHIFT is determined from EVS_yb as given by expression (2), and the value derived from bitshifting EVS_pmb by BITSHIFT using a shift register as given by expression (3) is output.

$$BITSHIFT = EVS\_yb-INT(EVS\_yb/24) \times 24 \qquad (2)$$

$$ShiftRegister = 2 \wedge BITSHIFT \times EVS\_pmb \qquad (3)$$

Given that EVS_yb is 1000, for example, BITSHIFT=16and ShiftRegister=2^16. This value is output synchronously with EVS_WADRS to the blocks in frame memory A+ and frame memory B+ for detection of brighter direction. The signal derived from inverting EVS_pmb is 1 when the pixel is darkened and 0 when it is brightened. The signal is input to the shift register and, according to EVS_WADRS, the output signals of expressions (2) and (3) are output to the blocks in the frame memory A− and the frame memory B−. In this way, 24 lines can be written in one address of the frame memory. At the same time, the shift register generates a YADR signal representing a bit position of the line address of EVS_yb in the 24 BIT. The following YADR signal is output.

$$YADR = 2 \wedge BITSHIFT \qquad (4)$$

As described above, data is written in the frame memory A and the frame memory B according to the x24frm pulse. Since multiple sets of data for adjacent 24 lines may be input during the x24frm write period, however, the address of EVS_WADRS temporarily stored in the write phase is read out, and an OR (logical sum) of the 24-bit data thus read out and a signal newly generated in the shift register is calculated. When the value of the bit, of the 24-bit data read out at this time, indicated by YADR as being set to 1 is 1 and the bit indicated by YADR newly generated by the shift register is 0, the bit set to 0 without ORing. In order to read the 24-bit data that has been stored temporarily, EVS_WADRS is input it to the address of the frame memory through a register that delays data one clock (CLK). By doing this, the latest bright or dark sign data is written during the write pulse period of x24frm.

The write operation described above is performed in the frame memory A+, the frame memory A− when x24frm is LOW, in the frame memory B+, the frame memory B− when x24frm is HIGH. The read operation and the 0 write operation described below are performed in the frame memory A+, the frame memory A− when x24frm is HIGH, in the frame memory B+, the frame memory B− when x24frm is LOW. The read address EVS RADRS is generated in a R address generator of FIG. 5. When the pixel size is, for example, 1280 (x)×720 (y), the addresses for all pixels of 1280×720 given by the expression (5) are sequentially generated from address 0 to match the rule of the expression (1). The data in the frame memory is read in the read period indicated by x24frm.

$$EVS\_RADRS = INT \left(yadrs/24\right) \times 2 \wedge 11 + xadrs \qquad (5)$$

xadrs=0 to 1279, yadrs=0 to 29

As soon as one address is read, 24-bit 0's are written in that address. Writing of 0 is performed by generating addresses for all 1280×720 pixels sequentially, starting from address 0, in the same way as EVS_RADRS. By switching the read data of the frame memory A+ and the frame memory B+ and the read data of the frame memory A− and the frame memory B− according to the x24frm pulses, the positive sign data and the negative sign data for 24 times the entire 60 frames are read out.

Figure 8:
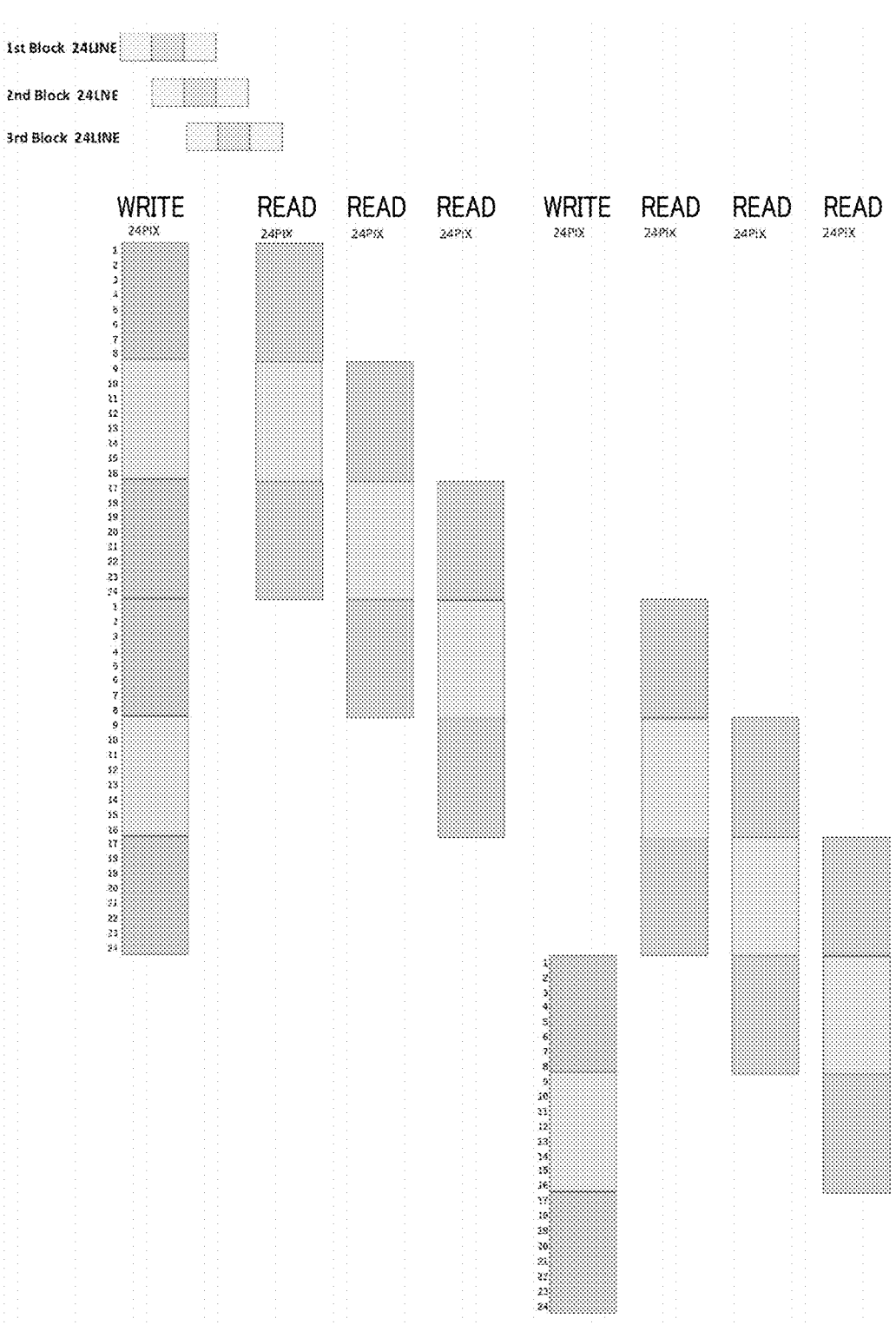
FIG. 8 is a diagram showing a method of reading out pixels in an image in the horizontal direction and the vertical direction.

One item of readout data represents sign data for 24 lines. Since motion vector calculation is performed in units of 8 pixelsx8 lines, a delay adjustment 48-line memory is used to provide, as shown in FIG. 8 a shift of 8 pixels at a time to read 24 pixels in the horizontal direction and to provide a shift of 8 lines at a time to read 24-line data in the vertical direction. The read operation is performed at a clock speed three times the clock speed of write or more. At the same time, the data derived from reading the positive sign data and the negative sign data for 24 times the 60 frames are delayed by a frame memory configured for 1/(24×60)-second frame units and are similarly read by providing a shift of 8pixels at a time to read 24 pixels and providing a shift of 8lines at a time to read 24-line data as shown in FIG. 8. In this way, vector calculation in each block can be done in a way that includes a portion overlapping the adjacent block.

Figure 9:
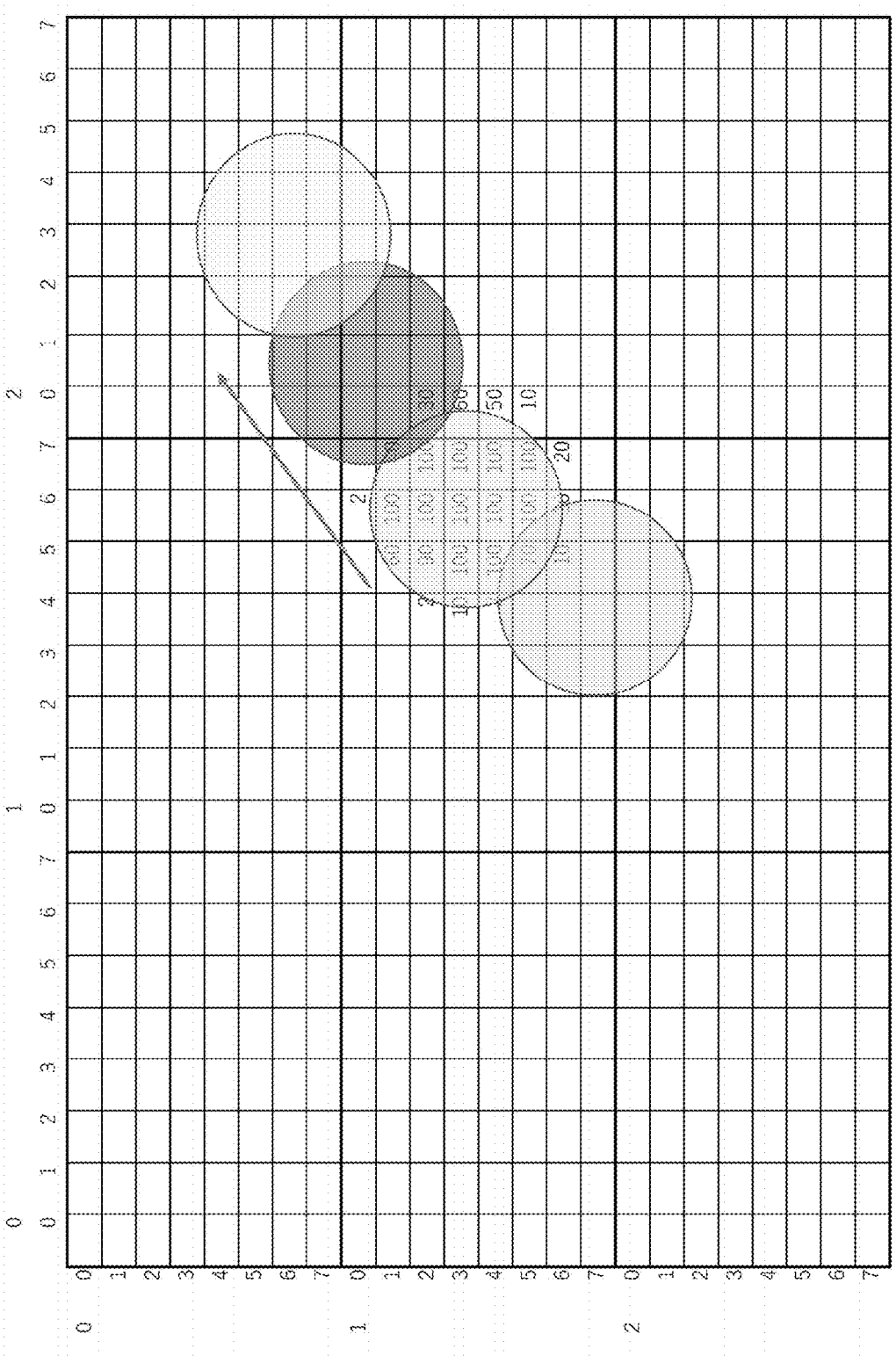
FIG. 9 is a diagram showing the motion of a subject in a frame.
Figure 10:
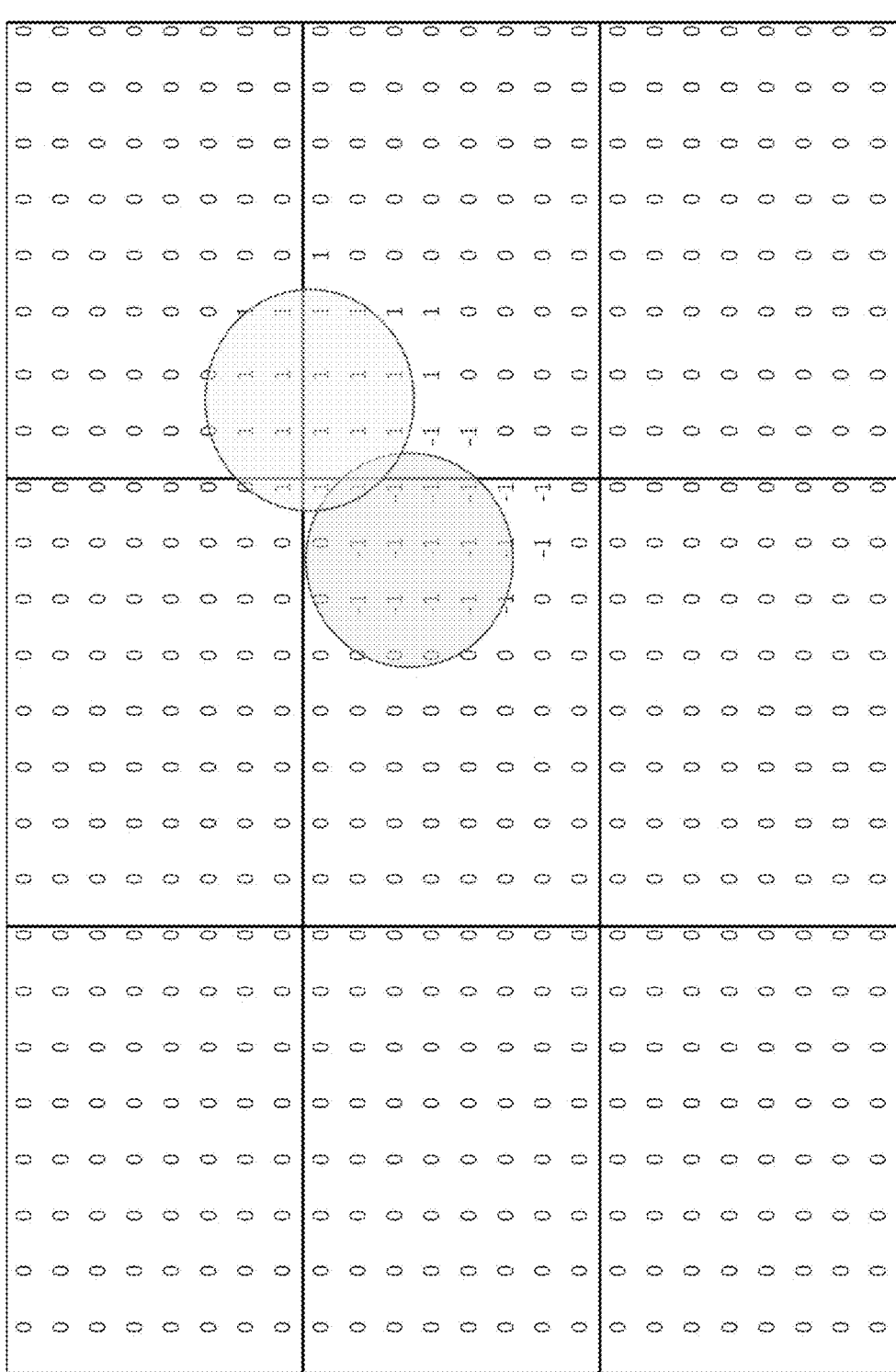
FIG. 10 is a diagram showing sign data of an event-based sensor showing a brightness change caused by the motion of the subject of FIG. 9.

A method of calculating a motion vector will now be explained. FIG. 9 shows that a circular subject in the 24×24 pixel range moves upward and right in 1/(24×60)-second frame units. The numeral in the figure denotes the code value of the Y signal. FIG. 10 shows sign data for an EVS signal showing a brightness change caused by the motion of the second circle and the third circle of FIG. 9.

For detection of the direction of motion, the weighting coefficient in the vertical direction Y axis and the weighting coefficient in the horizontal direction of X axis are multiplied by the positive side sign and the negative side sign, respectively. As described below, a sum for 24×24 pixels is determined for the current frame in a unit of 24×60 frames. A similar sum is determined for the frame one frame before. A difference is taken to determine the amount of motion in the Y axis and the X axis.

Figure 11A:
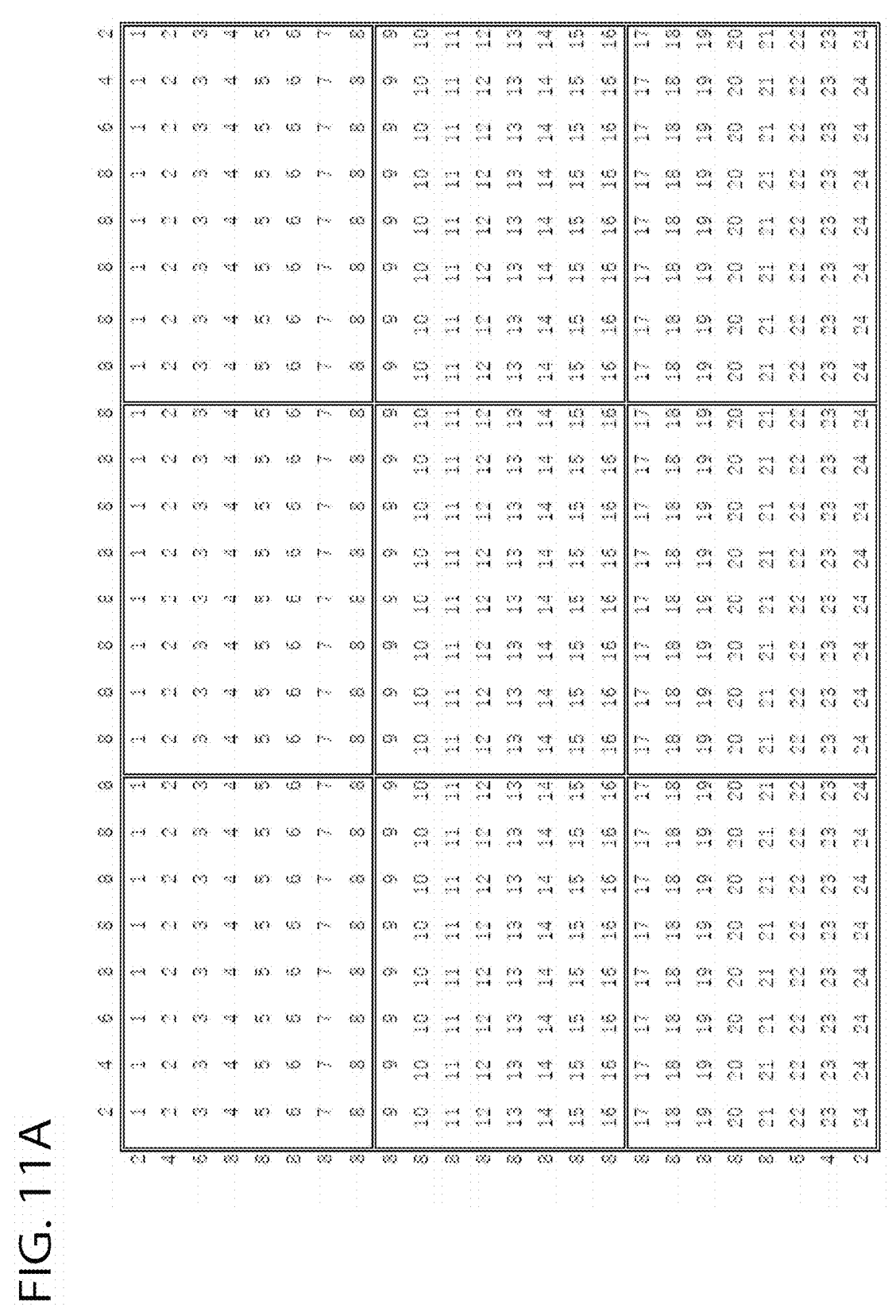
Figure 11B:
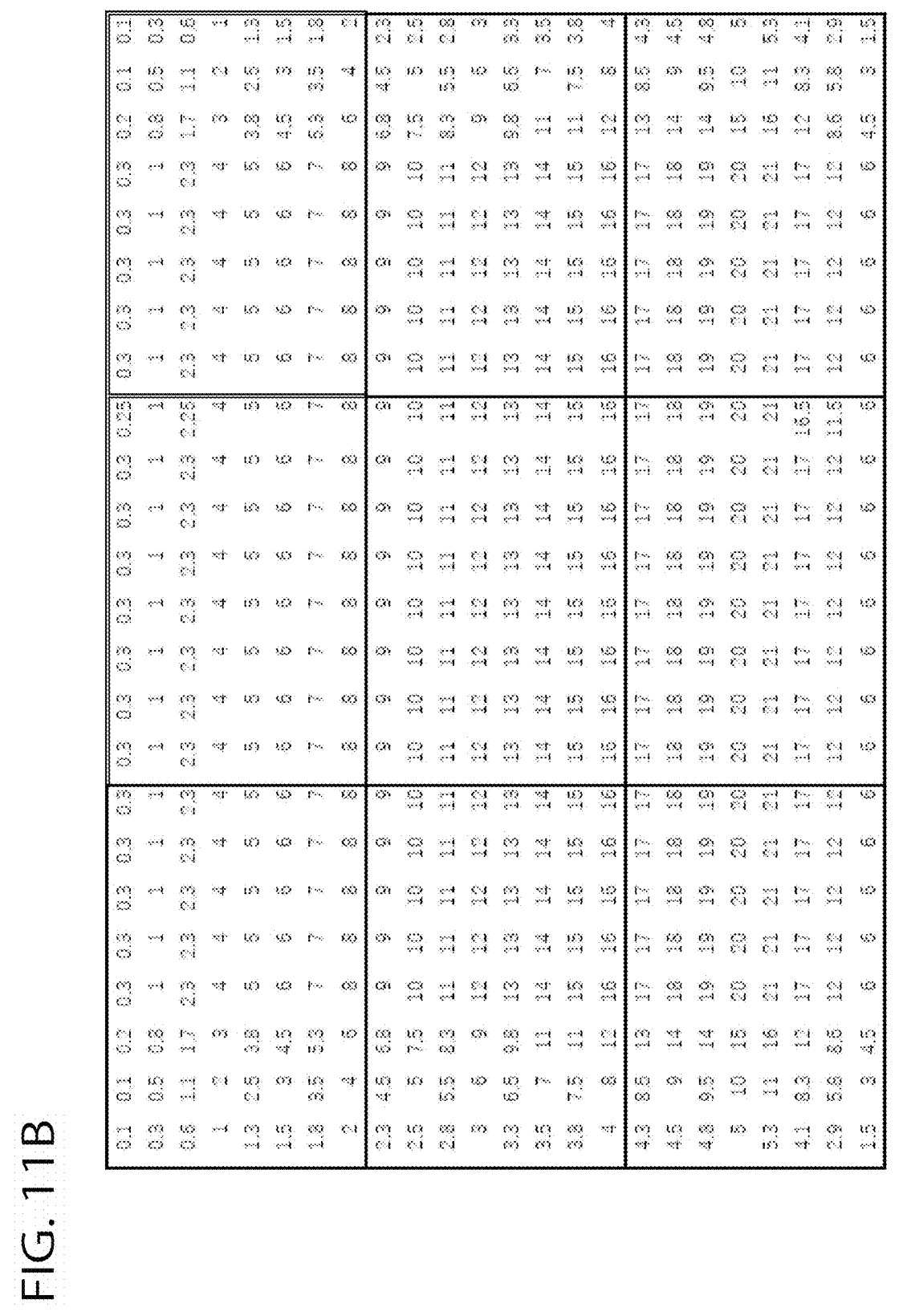

FIG. 11A shows a vertical coefficient that increases by 1 per one line in a block of 24×24 pixels. Numbers that decrease toward the four corners of the block are written around the block of FIG. 11A, and the numbers derived from dividing the numbers by 8 are peripheral coefficients. That is, in the case of 2, ⅜ is the peripheral coefficient, and in the case of 8, ⅝=1 is the peripheral coefficient. As shown in FIG. 11B, the weighting coefficient for the amount of vertical motion is a value derived from multiplying the vertical coefficient of each pixel of FIG. 11A by the peripheral coefficient. In the case of a pixel X=1, Y=3, for example, the vertical coefficient is 3, the peripheral coefficient in the X direction is ⅜, and the peripheral coefficient in the Y direction is ⅝. Therefore, the weighting coefficient for the amount of vertical motion will be 3×(⅖)×(⅝)≈0.6. The reason for applying the peripheral coefficient is to reduce, in the case of a motion across a boundary of the block, the contribution of the data to motion estimation.

Figure 13A:
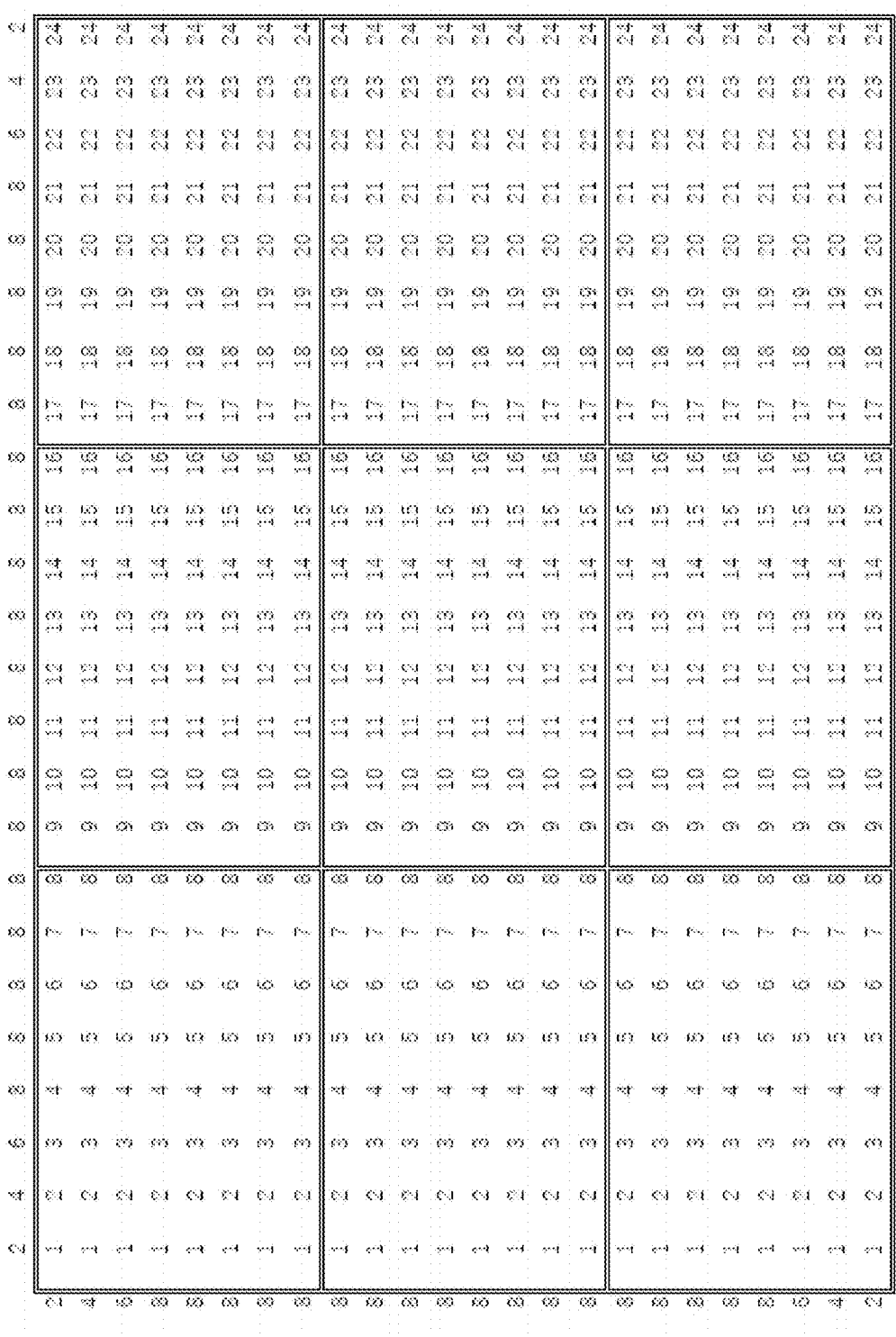
FIG. 13A shows horizontal coefficients and peripheral coefficients for the respective pixels in an image block.
Figure 13B:
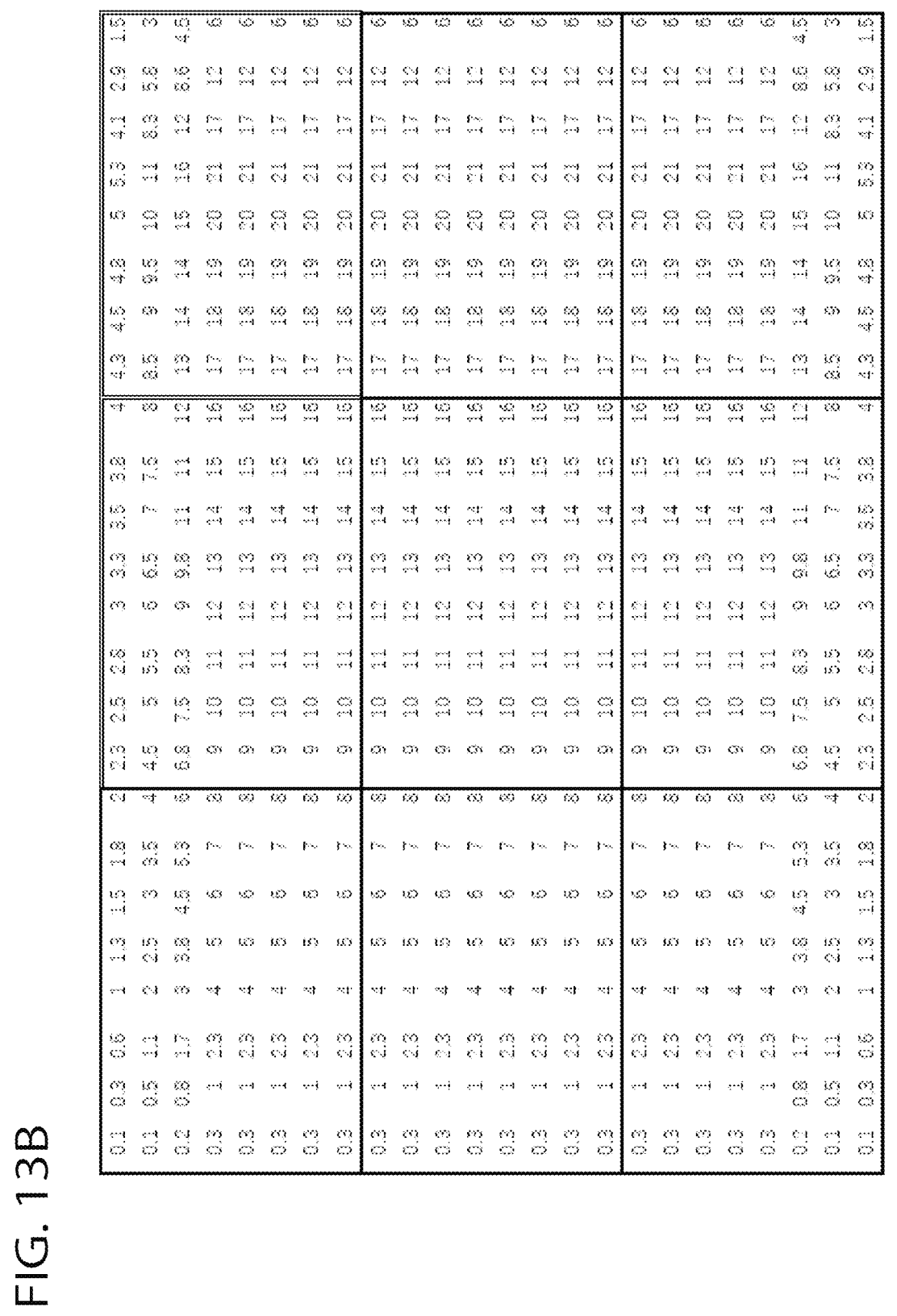

FIG. 13A shows a horizontal coefficient that increases by 1 per one pixel horizontally in a block of 24×24 pixels. Numerals that decrease toward the four corners of the block are written around the block of FIG. 13A, and the numbers derived from dividing the numerals by 8 are peripheral coefficients. As shown in FIG. 13B, the weighting coefficient for the amount of horizontal motion is a value derived from multiplying the horizontal coefficient of each pixel of FIG. 13A by the peripheral coefficient.

Figure 12A:
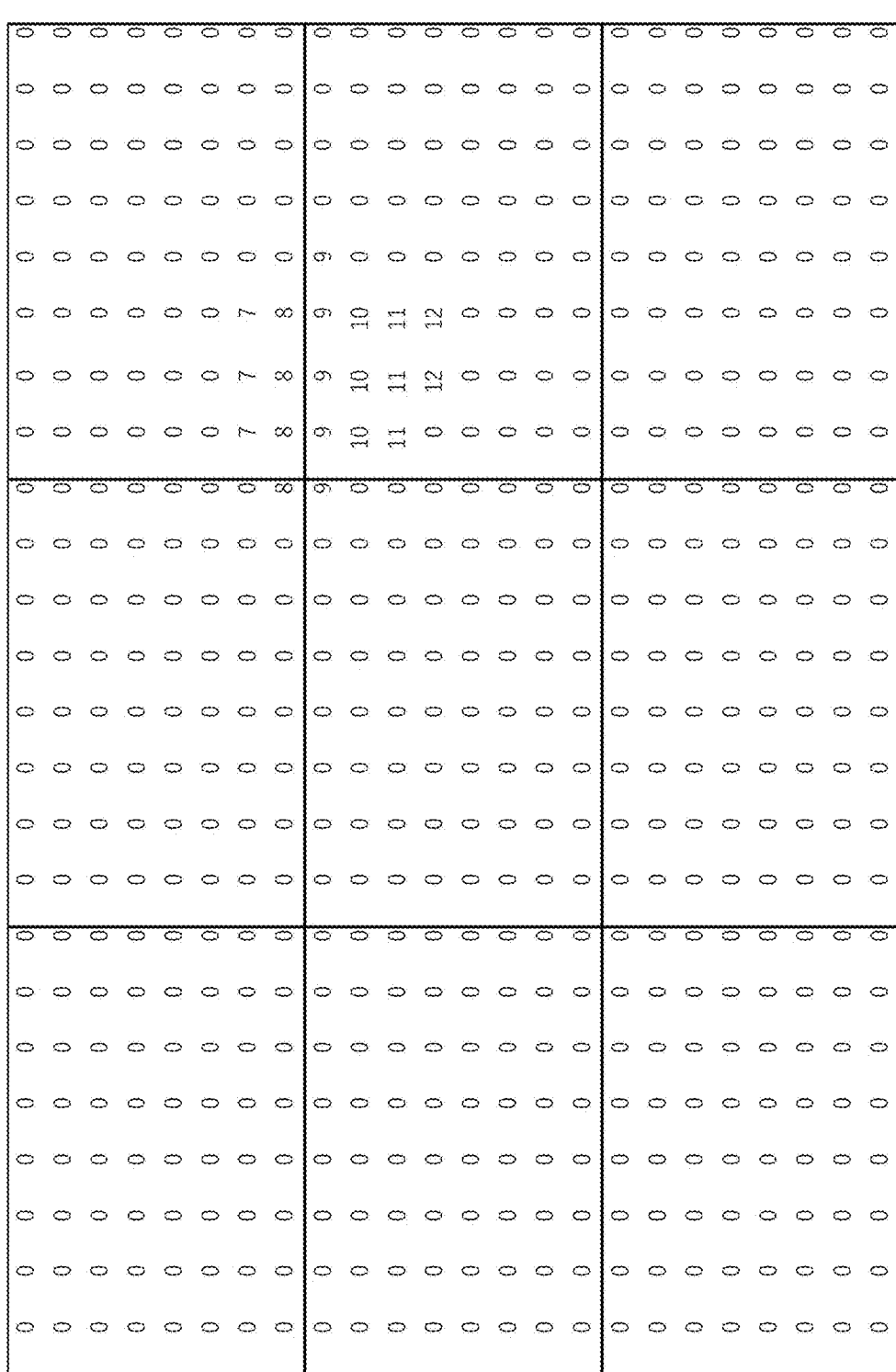
FIG. 12A shows a result of multiplying the sign data on the brighter side (positive side) of the EVS output of FIG. 10 by the weighting coefficients for the amount of vertical motion of FIG. 11B.

FIG. 12A shows a result of multiplying the sign data on the brighter side (positive side) of the EVS output of FIG. 10 by the weighting coefficients for the amount of vertical motion of FIG. 11B. This calculation is performed in the vertical-direction, positive-side weighting unit of FIG. 5, and the result is denoted by VP. There are 20 pixels that are positive according to the EVS output of FIG. 10, and the weighted values of FIG. 12A totaled for these positive pixels come to 185 so that an average is 185/20≈9.25.

Figure 12B:
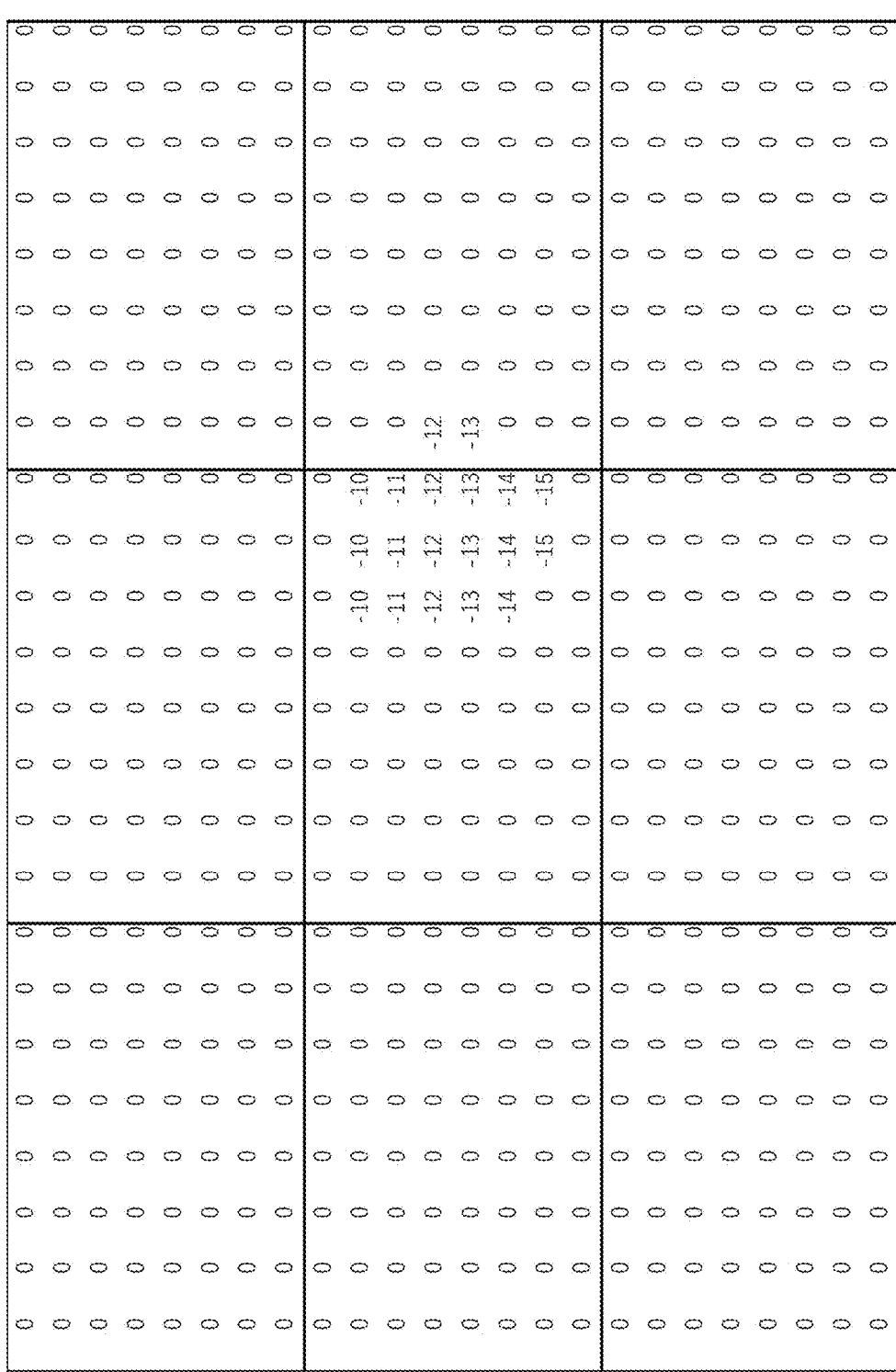
FIG. 12B shows a result of multiplying the sign data on the darker side (negative side) of the EVS output of FIG. 10 by the weighting coefficients for the amount of vertical motion of FIG. 11B.

FIG. 12B shows a result of multiplying the sign data on the darker side (negative side) of the EVS output of FIG. 10 by the weighting coefficients for the amount of vertical motion of FIG. 11B. This calculation is performed in the vertical-direction, negative-side weighting unit of FIG. 5, and the result is denoted by VM. There are 19 pixels that are negative according to the EVS output of FIG. 10, and the weighted values of FIG. 12B totaled for these negative pixels come to −235 so that an average is −235/19≈−12.37.

Figure 14A:
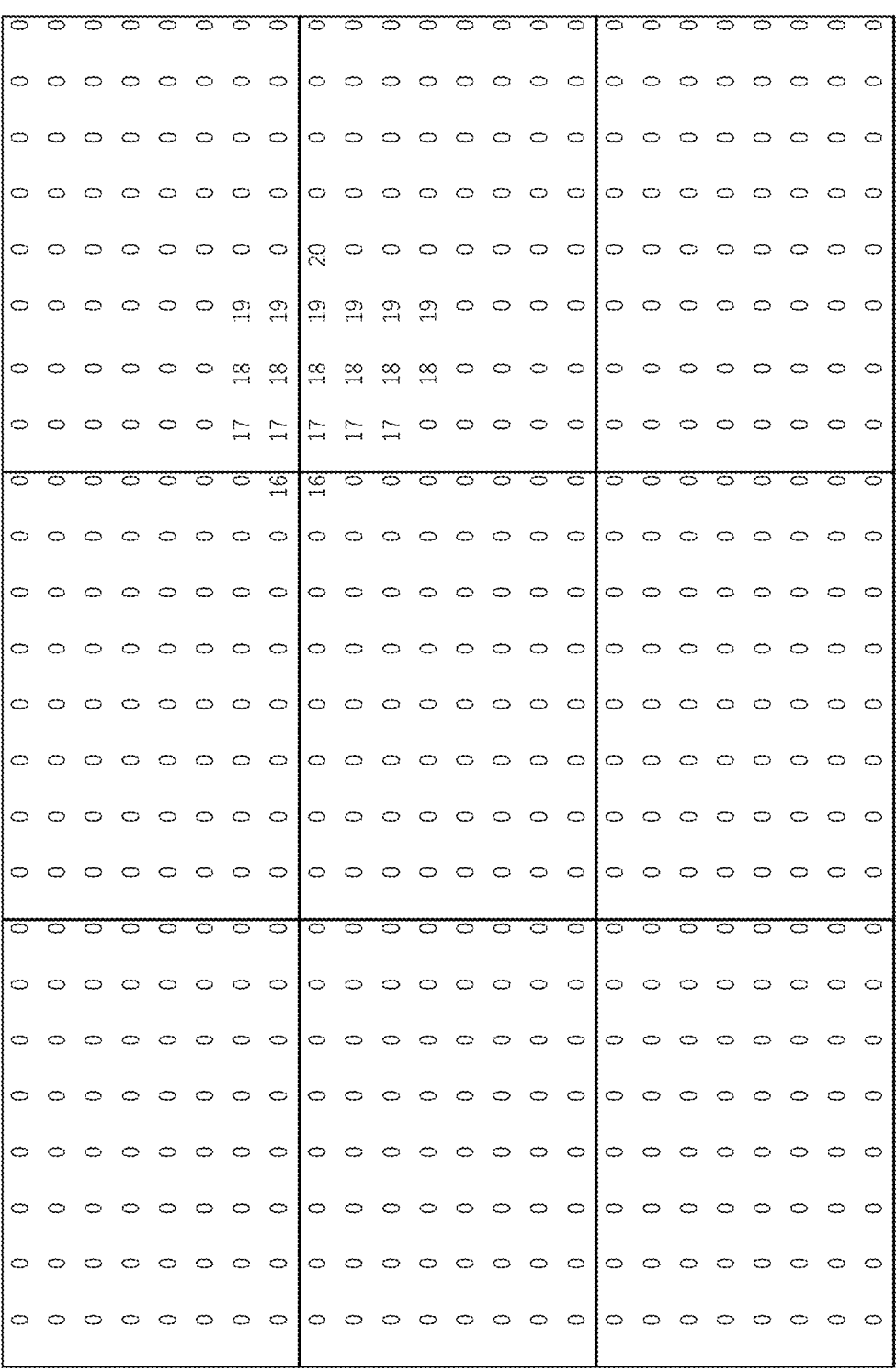
FIG. 14A shows a result of multiplying the sign data on the brighter side (positive side) of the EVS output of FIG. 10 by the weighting coefficients for the amount of horizontal motion of FIG. 13B.

FIG. 14A shows a result of multiplying the sign data on the brighter side (positive side) of the EVS output of FIG. 10 by the weighting coefficients for the amount of horizontal motion of FIG. 13B. This calculation is performed in the horizontal-direction, positive-side weighting unit of FIG. 5, and the result is denoted by HP. There are 20 pixels that are positive according to the EVS output of FIG. 10, and the weighted values of FIG. 14A totaled for these positive pixels come to 359 so that an average is 359/2017.95.

Figure 14B:
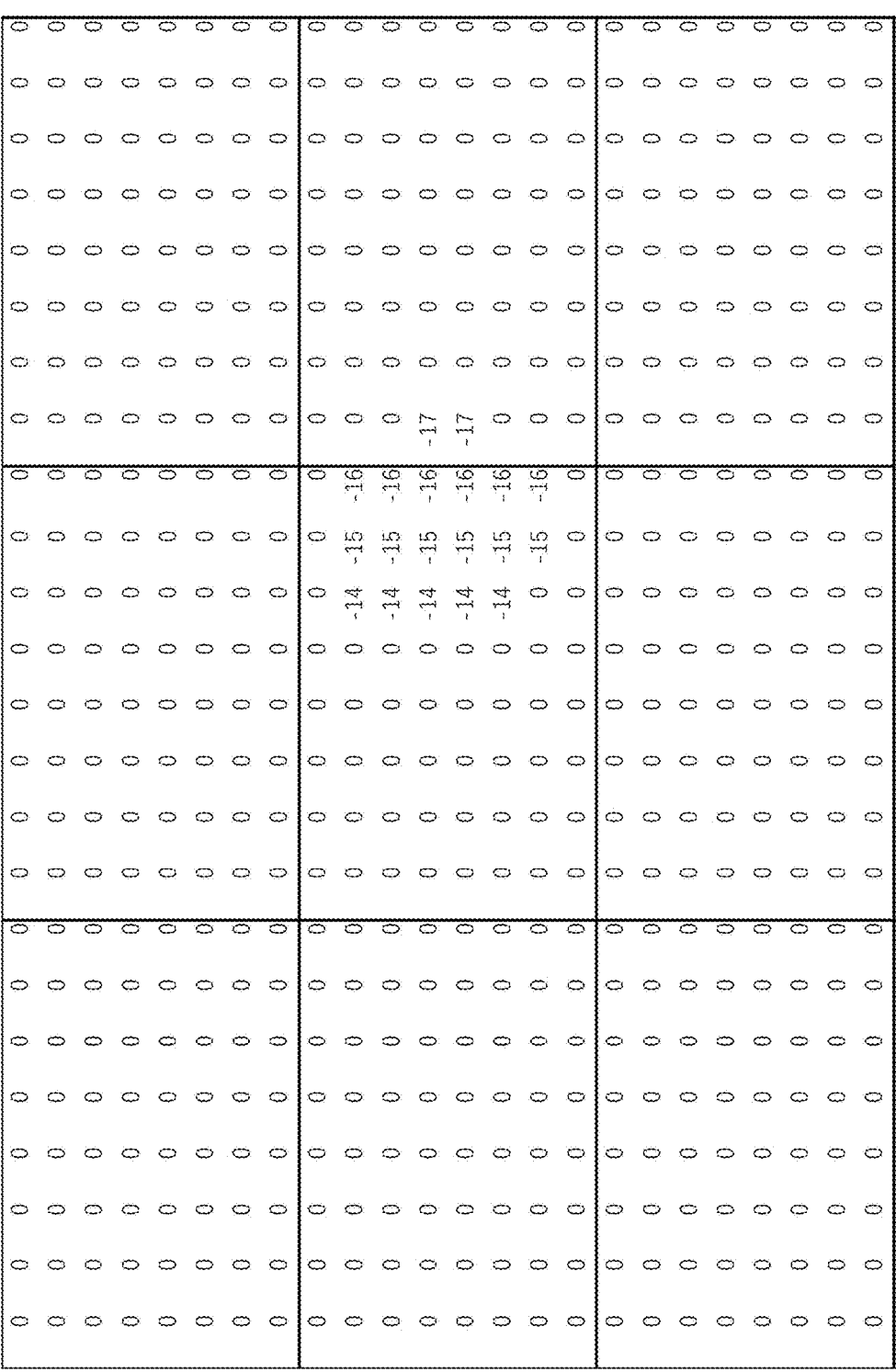
FIG. 14B shows a result of multiplying the sign data on the darker side (negative side) of the EVS output of FIG. 10 by the weighting coefficients for the amount of horizontal motion of FIG. 13B.

FIG. 14B shows a result of multiplying the sign data on the darker side (negative side) of the EVS output of FIG. 10 by the weighting coefficients for the amount of horizontal motion of FIG. 13B. This calculation is performed in the horizontal-direction, negative-side weighting unit of FIG. 5, and the result is denoted by HM. There are 19 pixels that are negative according to the EVS output of FIG. 10, and the weighted values of FIG. 14B totaled for these negative pixels come to −290 so that an average is −290/192−15.26.

Thus, the weighted values on the positive side in a block of 24×24 pixels in the direction of vertical motion are totaled for all 24×24 pixels, and the resultant value is divided by the number of positive pixels in the block of 24×24pixels to determine an average. In the examples of FIGS. 12A and 12B, the average in the vertical direction and on the positive side is 9.25, and the average in the vertical direction and on the negative side is −12. The calculation of these average values is performed in a vertical P 1 block averaging unit and a vertical M 1 block averaging unit of FIG. 5 to output a VPSUM signal and a VMSUM signal. VPSUM=9.25, and VMSUM=−12.37.

The weighted values on the positive side in a block of 24×24 pixels in the direction of horizontal motion are totaled for all 24×24 pixels, and the resultant value is divided by the number of positive pixels in the block of 24×24pixels to determine an average. In the examples of FIGS. 14A and 14B, the average in the horizontal direction and on the positive side is 18, and the average in the vertical direction and on the negative side is −15. This calculation is performed in a horizontal P 1 block averaging unit and a horizontal M 1block averaging unit of FIG. 5 to output a HPSUM signal and a HMSUM signal. HPSUM=17.95, and HMSUM=−15.26.

The calculation above to determine an average brightness change in a block of 24×24 pixels is also performed one frame before. The delay adjustment frame memory of FIG. 5 performs a similar calculation in a video one frame before with a period ¹⁄₂₄ times the period of 60 frames.

Figure 15:
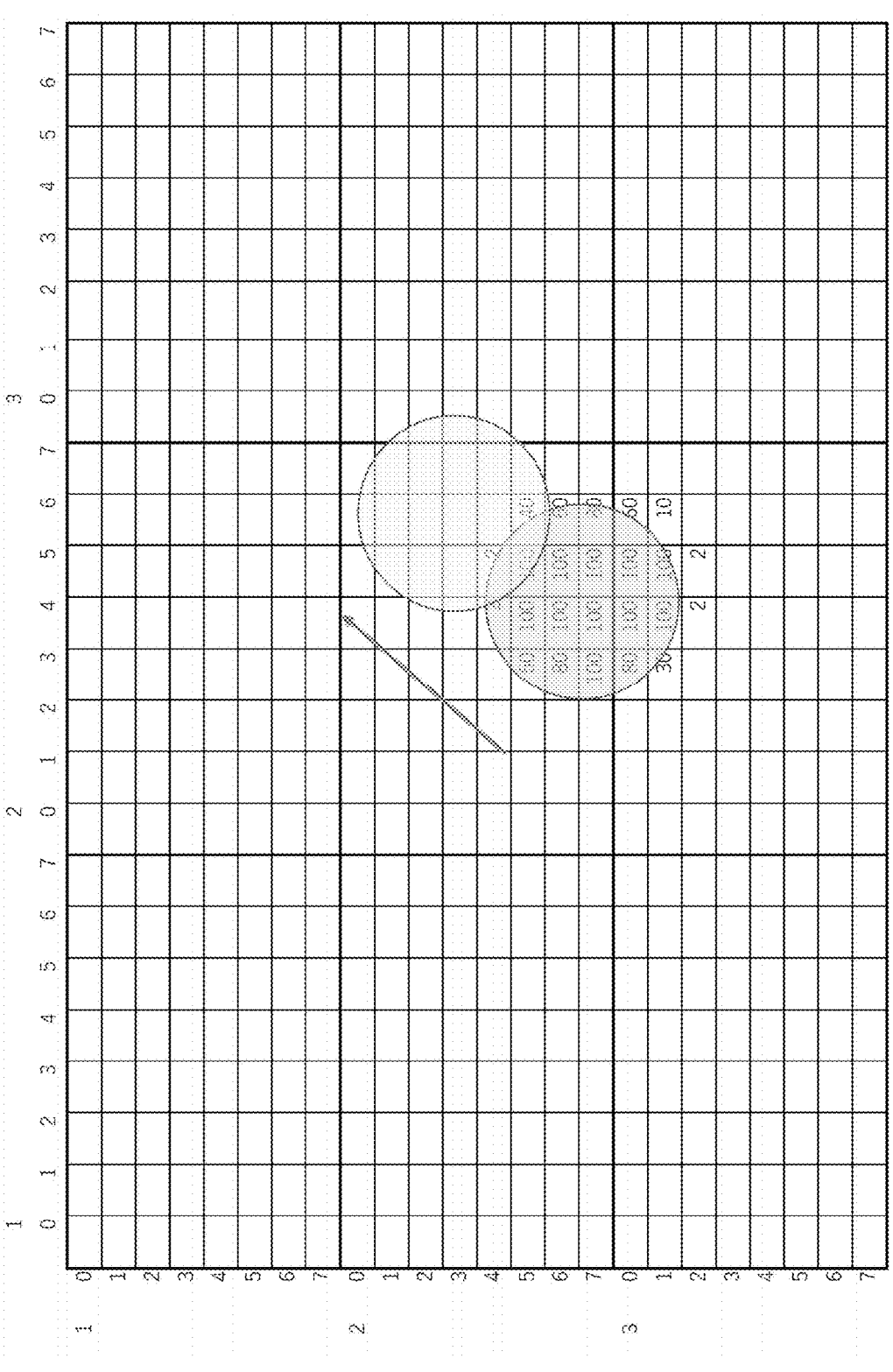
FIG. 15 is a diagram showing the motion of the subject one frame before.
Figure 16:
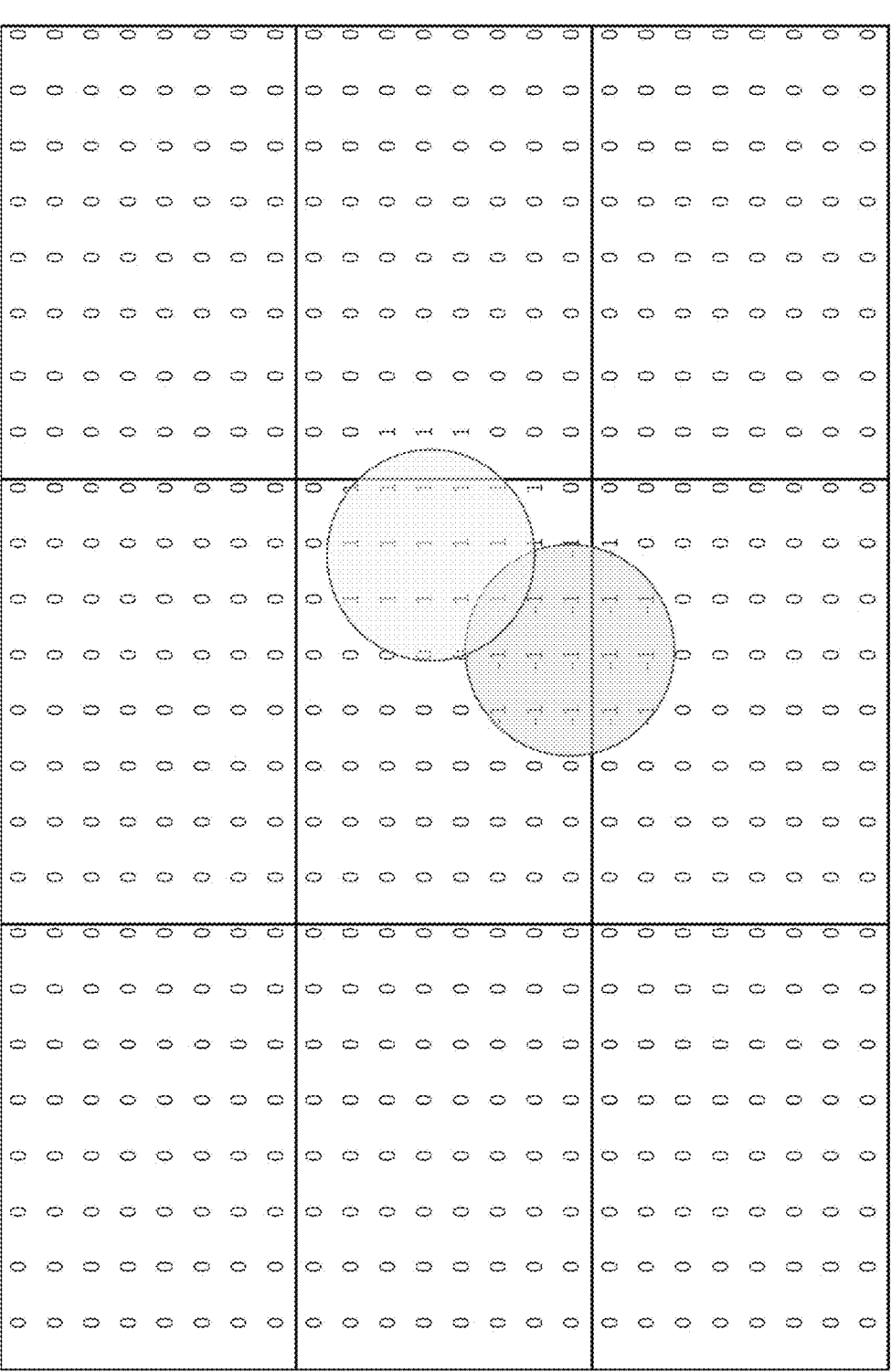
FIG. 16 is a diagram showing sign data of the event-based sensor for a brightness change caused by the motion of the subject of FIG. 15.

FIG. 15 shows the motion of the subject and the state of the Y signal one frame before. FIG. 16 shows sign data for the EVS signal resulting from the brightness change caused by the motion of the first circle and the second circle of FIG. 15. There are 18 pixels of positive sign data and 18 pixels of negative sign data.

Figure 17A:
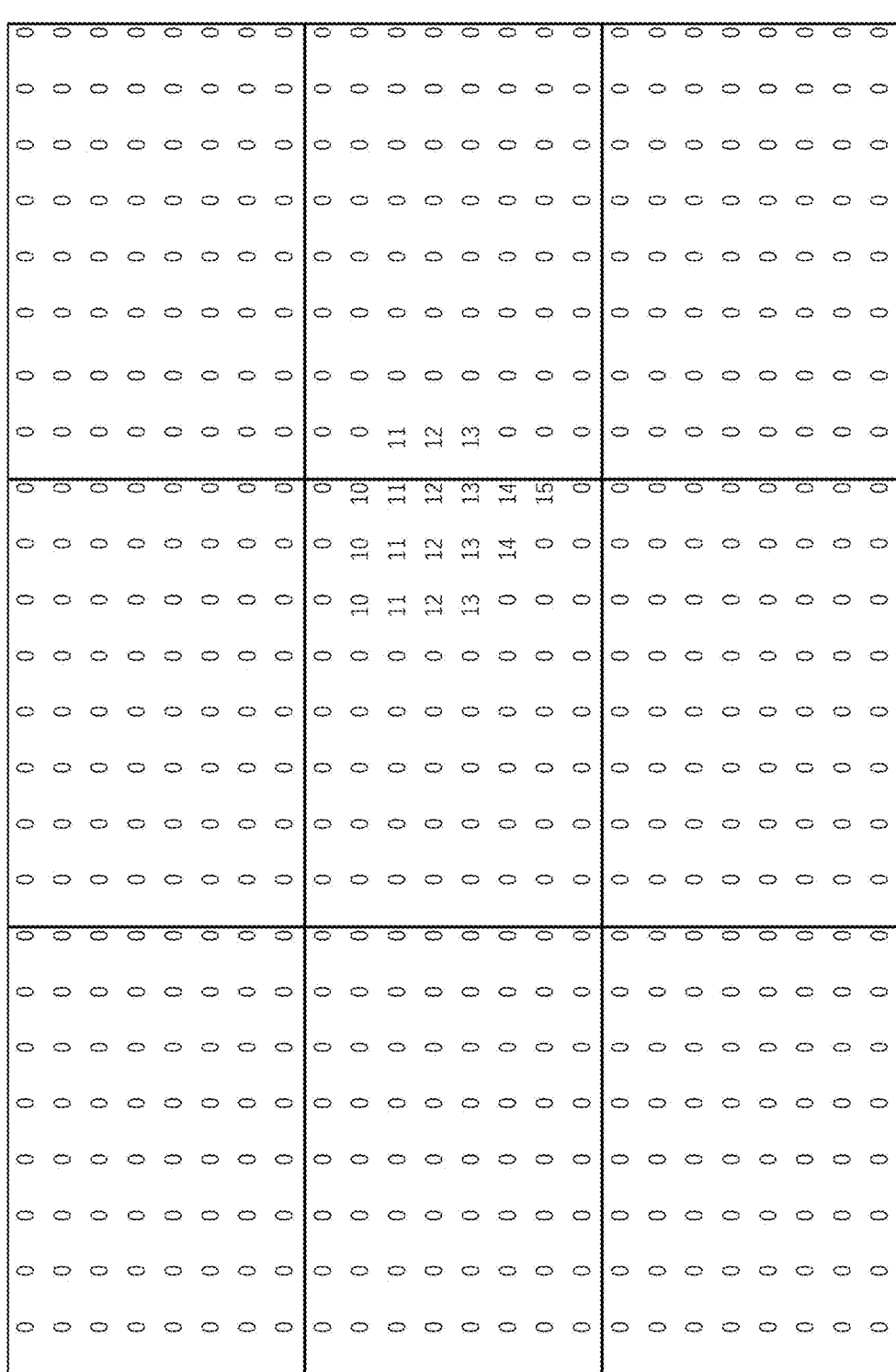
FIG. 17A is a diagram showing a result of multiplying the sign data of FIG. 16 for a positive brightness change by the weighting coefficients for the amount of vertical motion of FIG. 11B.

FIG. 17A shows a result of multiplying the sign data of FIG. 16 for a positive brightness change by the weighting coefficients for the amount of vertical motion of FIG. 11B. The weighted values of the positive pixels add up to 217, and an average is 217/18≈12.06.

Figure 17B:
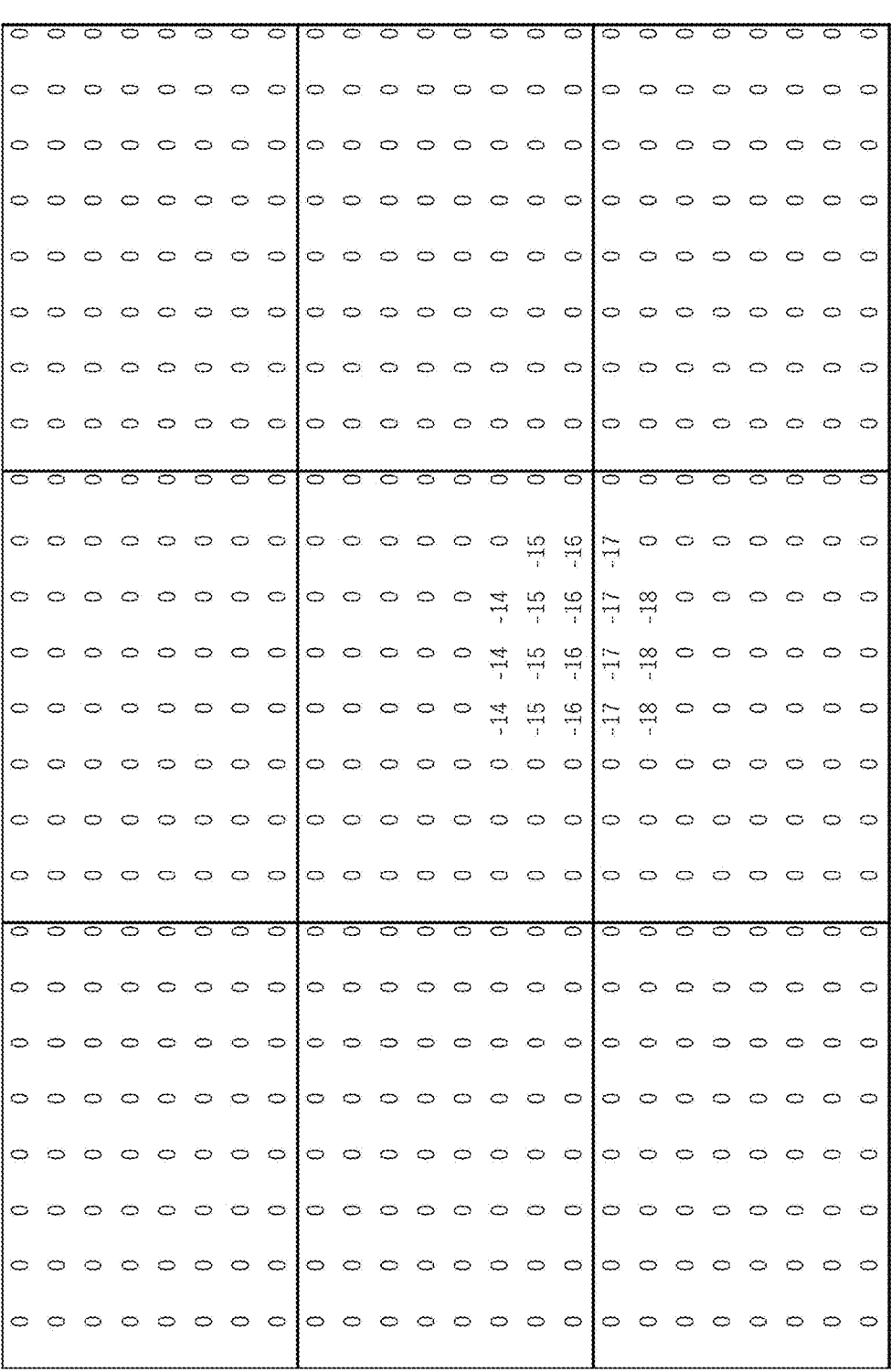
FIG. 17B is a diagram showing a result of multiplying the sign data of FIG. 16 for a negative brightness change by the weighting coefficients for the amount of vertical motion of FIG. 11B.

FIG. 17B shows a result of multiplying the sign data of FIG. 16 for a negative brightness change by the weighting coefficients for the amount of vertical motion of FIG. 11B. The weighted values of the negative pixels add up to −288, and an average is −288/18≈−16.0.

Referring to FIG. 5, the average value in the vertical direction and on the positive side is represented by a VPSUM1f signal, and the average value in the vertical direction and on the negative side is represented by a VMSUM1f signal. VPSUM1f=12.06, and VMSUM1f=−16.0.

Figure 18A:
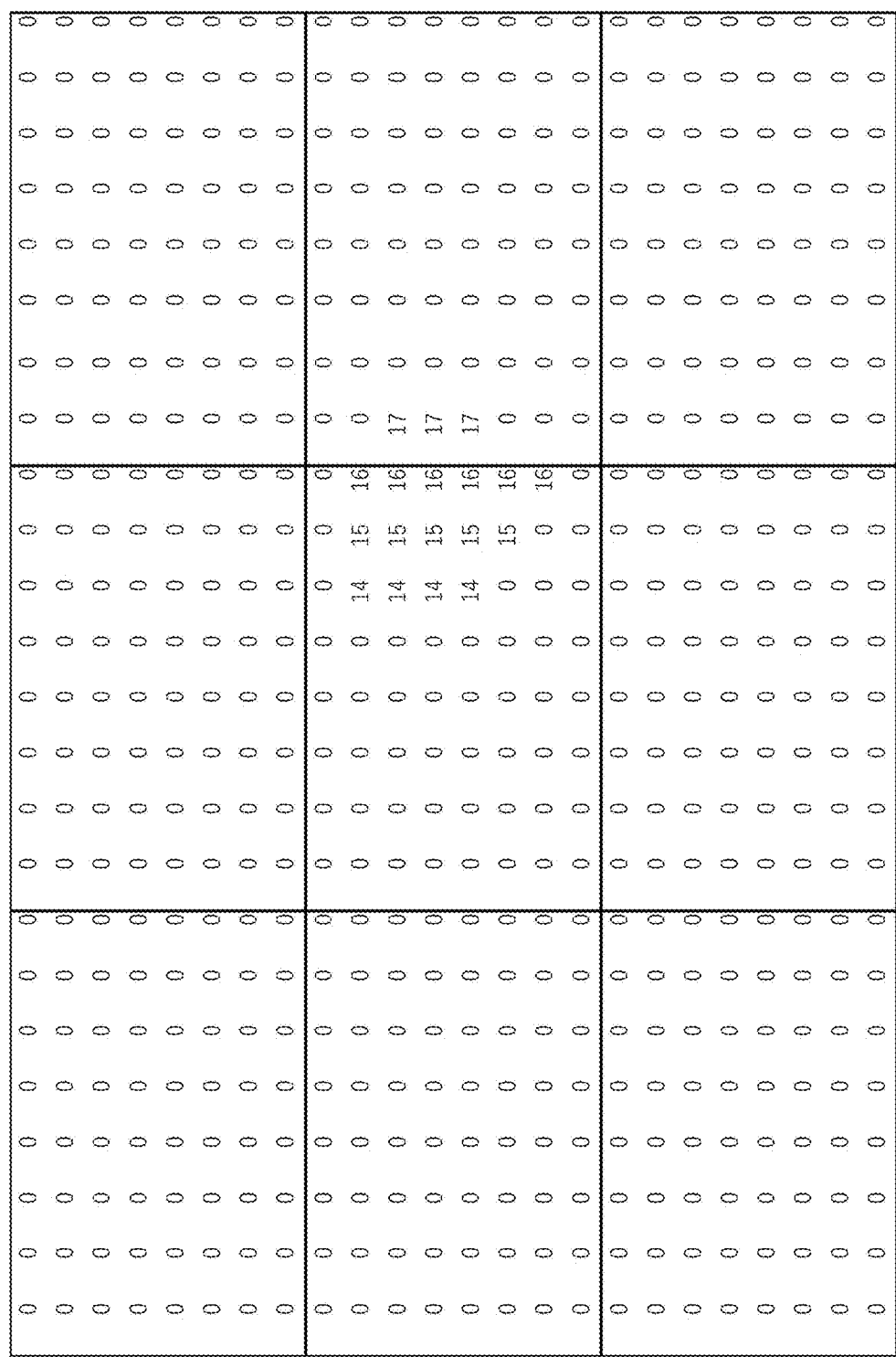
FIG. 18A is a diagram showing a result of multiplying the sign data of FIG. 16 for a positive brightness change by the weighting coefficients for the amount of horizontal motion of FIG. 13B.

FIG. 18A shows a result of multiplying the sign data of FIG. 16 for a positive brightness change by the weighting coefficients for the amount of horizontal motion of FIG. 13B. The weighted values of the positive pixels add up to 278, and an average is 278/18≈15.44.

Figure 18B:
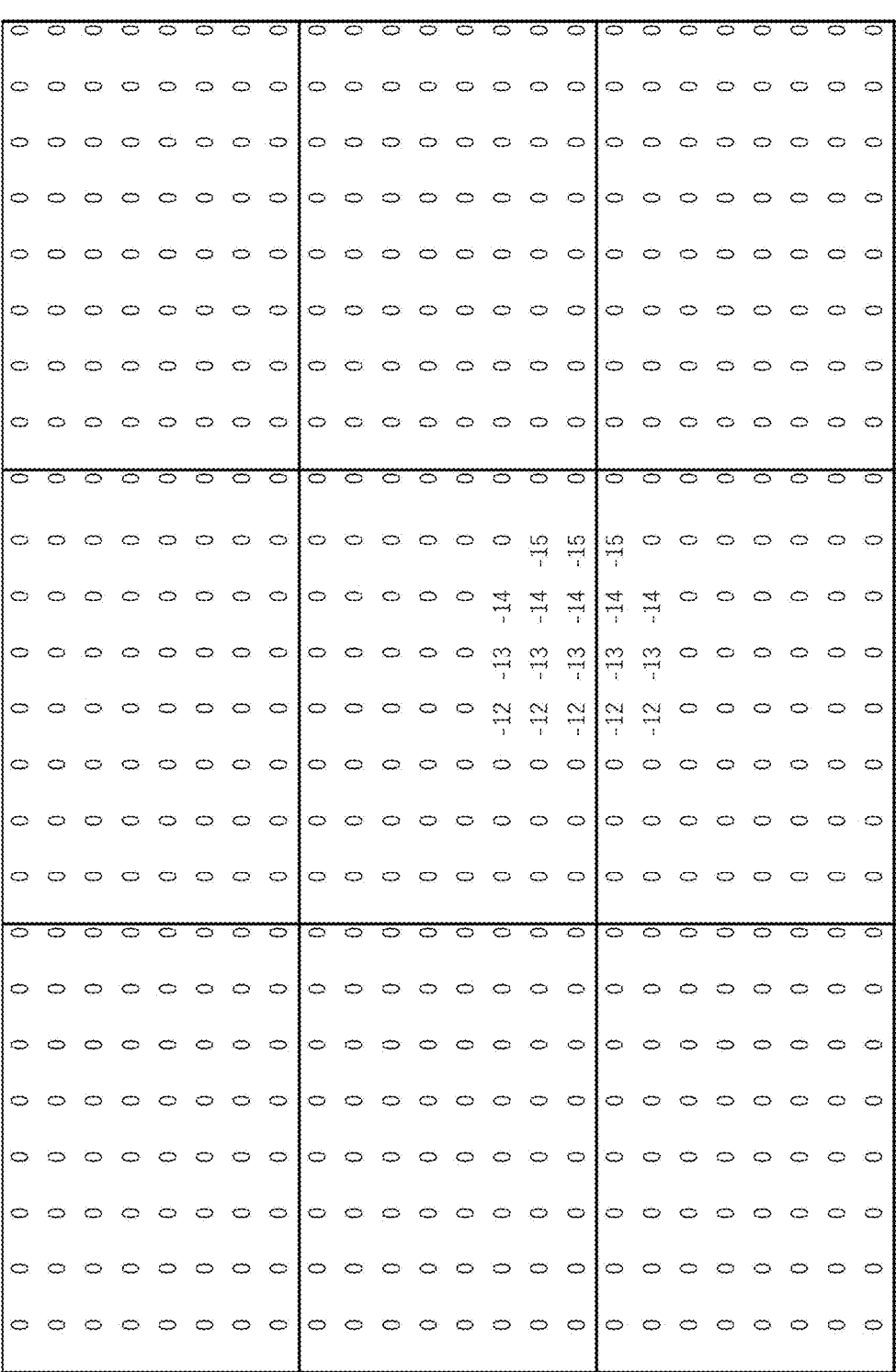
FIG. 18B is a diagram showing a result of multiplying the sign data of FIG. 16 for a negative brightness change by the weighting coefficients for the amount of horizontal motion of FIG. 13B.

FIG. 18B shows a result of multiplying the sign data of FIG. 16 for a negative brightness change by the weighting coefficients for the amount of horizontal motion of FIG. 13B. The weighted values of the negative pixels add up to −240, and an average is −240/18≈=13.33.

Referring to FIG. 5, the average value in the vertical direction and on the positive side is represented by a HPSUM1f signal, and the average value in the horizontal direction and on the negative side is represented by a HMSUM1f signal. HPSUM1f=15.44, and HMSUM1f=−13.33.

The vertical motion vector is determined by finding a difference between the weighted average value of the amount of vertical motion in the current frame and the weighted average value of the amount of vertical motion one frame before. This difference represents the average vertical motion of the subject in the 24×24 block. The difference is determined both on the positive and negative sides, and an average is defined as vertical motion vector amount VVECT1Fr in one frame in a 24×60 frame period.

The average on the negative side is dealt with as a negative value, and the vertical motion vector amount VVECT1Fr is determined by the following expression.

$$VVECT1Fr =$$ (6)

$$((VPSUM - VPSUM1f) + (-1) \times (VMSUM - VMSUM1f))/2$$

In the examples of FIGS. 17A and 17B, VVECT=((9.25–12.06)–(–12.37+16.0))/2~–3.2. When this value is negative, it indicates that the subject is moving toward the top of the screen, and, when it is positive, it indicates that the subject is moving toward the bottom of the screen.

The vertical motion vector is determined by finding a difference between the weighted average value of the amount of horizontal motion in the current frame and the weighted average value of the amount of horizontal motion one frame before. This difference represents the average horizontal motion of the subject in the 24×24 block. The difference is determined both on the positive and negative sides, and an average is defined as horizontal motion vector amount HVECT1Fr in one frame in a 24×60 frame period.

The average on the negative side is dealt with as a negative value, and the horizontal motion vector amount HVECT1Fr is determined by the following expression.

$$HVECT1Fr =$$ (7)

$$((HPSUM - HPSUM1f) + (-1) \times (HMSUM - HMSUM1f))/2$$

In the example of FIGS. 18A and 18B, HVECT=((17.95–15.44)–(–15.26+13.33))/2=2.22. When this value is negative, it indicates that the subject is moving leftward in the screen, and when, it is positive, it indicates that the subject is moving rightward in the screen.

Since the vector amount of VVECT1Fr and HVECT1Fr is an amount of motion in a very short period of time defined by 24×60=1440 fps, the motion of a subject usually falls within several pixels, which is accommodated in the 24×24 pixels, given a sensor of 1280×720 pixels. This vector calculation is performed sequentially for each 8×8 block, and the result is stored in the block-by-block motion vector 24Fr addition memory, using the block number value output by the block number counter as the address. The calculation is made so that the vertical and horizontal vectors are added to the block-by-block motion vector 24Fr addition memory in units of 1440 fps. When the vectors for 24 frames are added up, the sums VVECT24Fr, HVECT24Fr are output and stored in a block-by-block motion vector memory in the following stage. After the output, the sum value in the block-by-block motion vector 24Fr addition memory is reset to 0. The vector resulting from the addition across 24 frames represents a vector in a 60 FPS unit and represents a motion vector in an R, G, and B image.

The addition in the block-by-block motion vector 24Fr addition memory is reset to 0 when a 60FrmVrst pulse is HIGH. However, the timing can be varied according to the shutter time of the RGB sensor to obtain a more accurate motion vector.

FIG. 6 shows the reset timing 60FrmVrst in the case the RGB sensor has a shutter speed of ⅟60 seconds. The motion of a subject in 8×8 pixels is shown at the top of FIG. 6. The RGB sensor runs at 60 FPS in this example, and its synchronization signal, VSYNC, is the timing shown in FIG. 6. It is assumed here that the RGB sensor is a global shutter sensor that acquires all pixels of a video at the same point of time. When the shutter speed is ⅟60 seconds, the sensor is exposed to the light from the subject between a VSYNC and the next VSYNC. Therefore, as in the state prior to VSYNC in the "RGB ⅟60-second accumulation" column of FIG. 6, the subject captured by the RGB sensor is blurred in the upper right direction due to a motion in ⅟60 seconds. Further, the subject is blurred in the lower right direction in the next VSYNC, when the subject goes down. On the other hand, the EVS detects a brightness change asynchronously and at a high speed, and so there is no blurring. When calculating a motion vector from blur-free EVS output data, it is preferable to time the start point and the end point of vector calculation to coincide with the center of the blur of the subject of the RGB sensor.

When the vector is calculated, starting where the subject indicated by the black circle in FIG. 6 and ending where it is indicated by the next black circle, the determination of the vector will be timed to coincide with the center of the blur of the subject of the RGB sensor, which allows a comparison with the center of the blur in the next frame in inter-frame noise suppression. Therefore, as in FIG. 6, the reset by 60FrmVrst is timed to coincide with the midpoint between VSYNCs plus a one-frame delay as shown in FIG. 6. This one-frame delay takes into account the delay in the memory for internal processing. The timing of reset by 60FrmVrst is generated from VSYNC according to the delay amount given by the following expression. Denoting the frame rate of the RGB sensor by RGBFPS, the accumulation cycle of the frame memory for the event sensor by EVSFPS, and the shutter speed by RGBSH, the timing 60FrmVrstTiming of reset by 60FrmVrst is determined by the following expression.

$$60FrmVrstTiming =$$ (8)

$$INT((RGBSH/2)/(1/EVSFPS)) \times (1/EVSFPS) + 1/EVSFPS.$$

When the frame rate of the RGB sensor RGBFP=60 (FPS), the shutter speed RGBSH=⅟60 (seconds), and the storage rate of the frame memory for the event sensor EVSFPS=24×RGBFP, for example, the timing will be 0.009027778 seconds based on expression (8). This is equivalent to 13 frames in the x24frm variation period.

Figure 7:
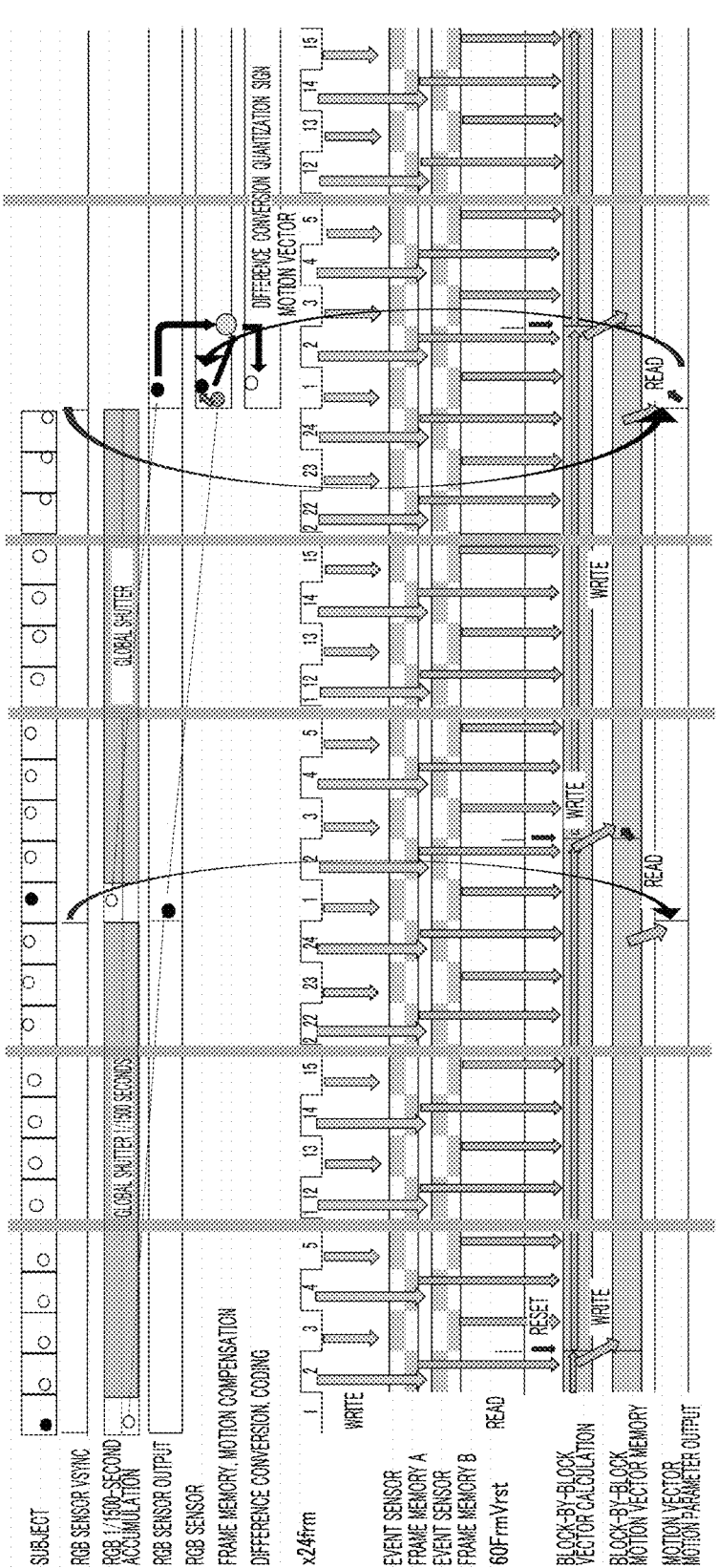
FIG. 7 is a timing chart showing the operation of the motion vector estimation unit in the case of a higher shutter speed.

FIG. 7 shows an example in which the shutter speed RGBSH is ⅟1500 seconds. The delay amount is determined according to expression (8) to adapt to the shutter speed. This is equivalent to one frame in the x24frm pulse variation period.

According to the timing of 60FrmVrst, which is varied according to the shutter speed, the vectors for 24frames in the 1440 FPS unit are added up in the block-by-block motion vector 24Fr addition memory, the vector values thus added up are written in the block-by-block motion vector memory, and the data in the memory is read block by block according to the VSYNC timing to obtain motion parameters of VVECT, HVECT.

The motion vector estimation unit 34 acquires the motion parameter in this way and inputs the motion parameter to the motion compensation unit 32 of FIG. 3. The motion compensation unit 32 moves, by a value determined by changing the sign of motion parameter, a range of 8×8-pixel block division in the Y signal delayed by one frame according to the frame rate of the RGB sensor and determines a difference from the newly arriving Y signal.

Figure 19:
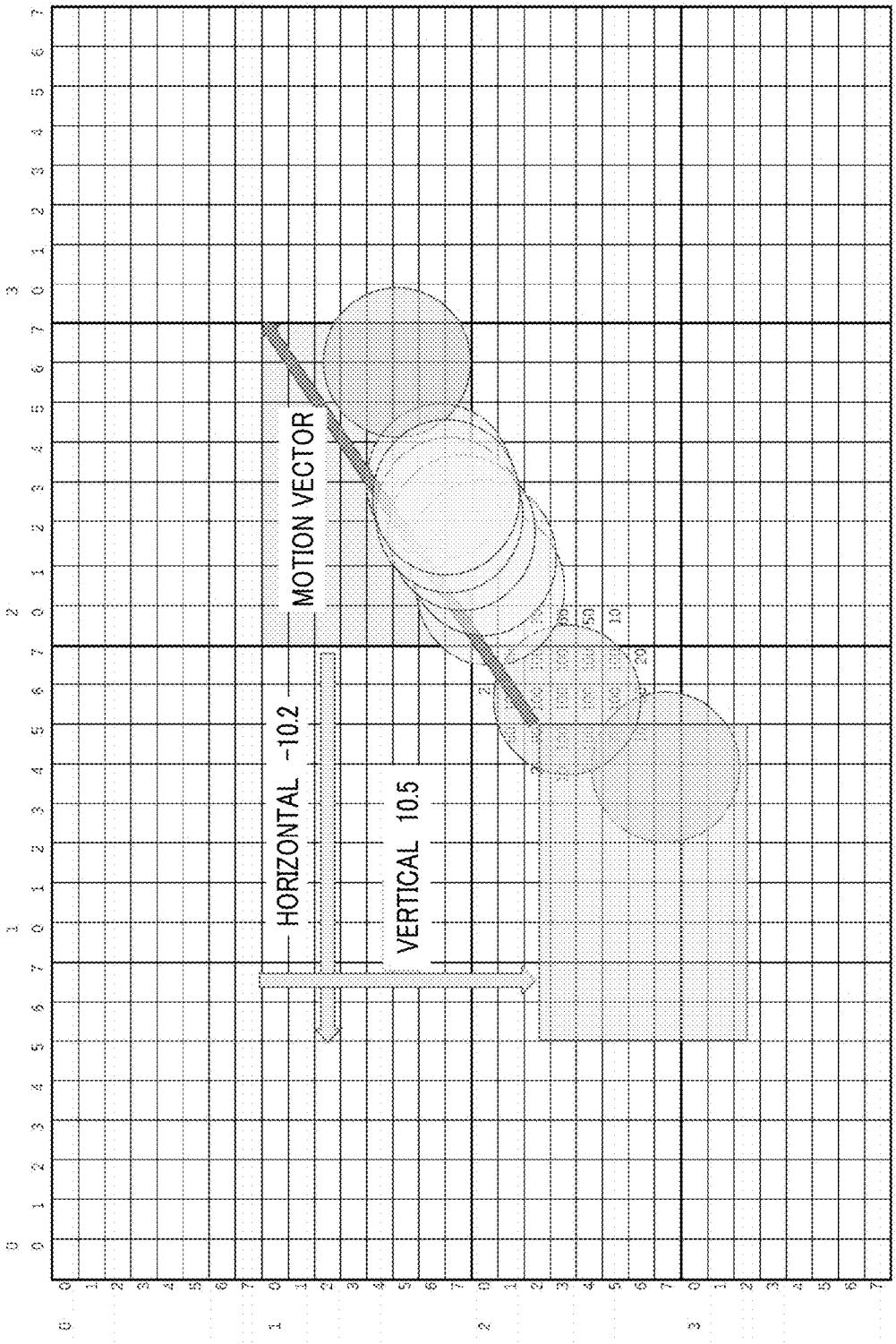
FIG. 19 is a diagram showing a method of using a motion vector to move a block subject to motion search.

FIG. 19 is a diagram showing a method of using a motion vector to move a block subject to motion search. In the case of FIG. 19, the motion vector is such that the horizontal HVECT is 10.2, and the vertical VVECT is −10.5. The data for an area of 8×8 pixels derived from subtracting the motion vector from the Y signal one frame before is extracted from the frame memory for one frame of FIG. 3. When the motion vector is small, interpolation with a phase accuracy of ¼ pixel is performed for determination. The 8×8 area obtained according to the motion vector from one frame before is shifted in the sequence as shown in FIG. 20A to determine correlation between the above data and the area of 8×8 pixels of the newly arriving Y signal and to search for data.

Figure 20A:
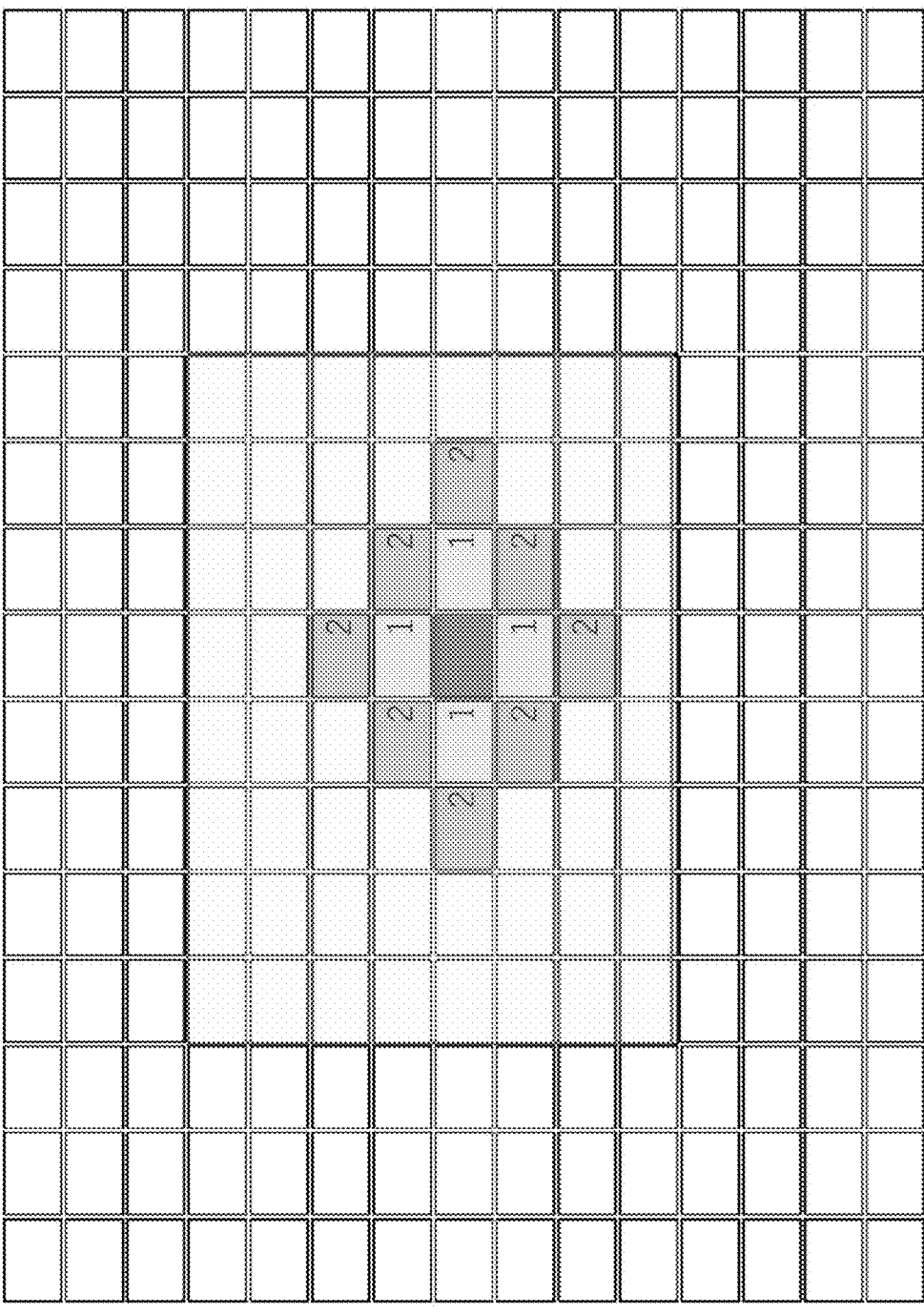
FIG. 20A shows a search for an area of 8×8 pixels in units of one pixel in the first search.
Figure 20B:
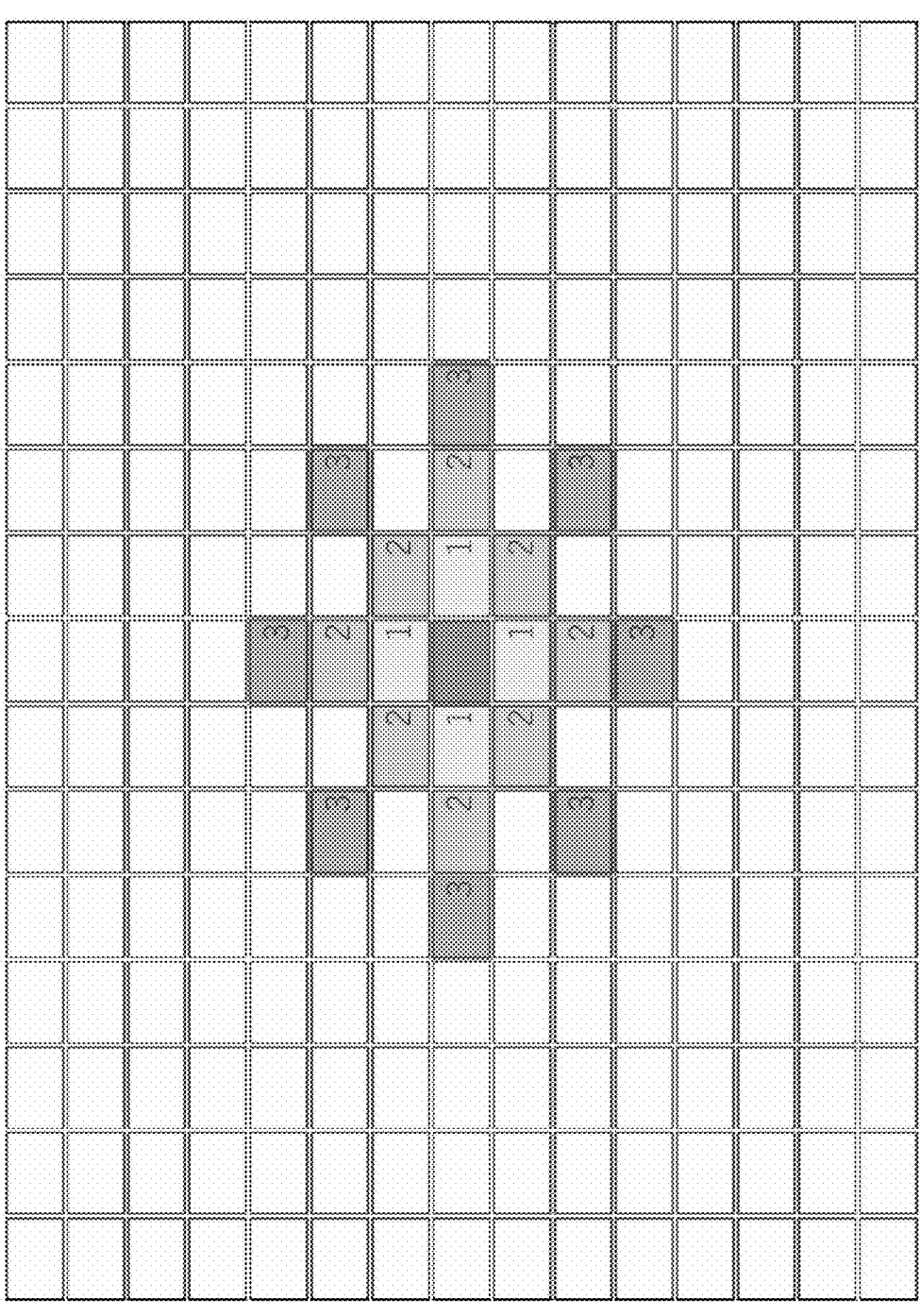
FIG. 20B shows a method for interpolating data in units of ¼ pixels in the second search.

FIG. 20A shows a search for an area of 8×8 pixels in units one pixel in the first search, and FIG. 20B shows a method of interpolating pixel data in units of ¼ pixels in the second search. When the correlation value falls below a certain thresh, a phase with a high degree of correlation is determined by interpolating the data in units of ¼ pixels to continue the search. When the correlation is found to be equal to or less than the thresh after all searches have been performed, the block is not moved and a frame difference is determined in the same block.

The search can be performed with higher accuracy when interframe noise suppression is performed. It may, however, lead to a delay in the process so that suppression may not be performed if it is not necessary.

Figure 21:
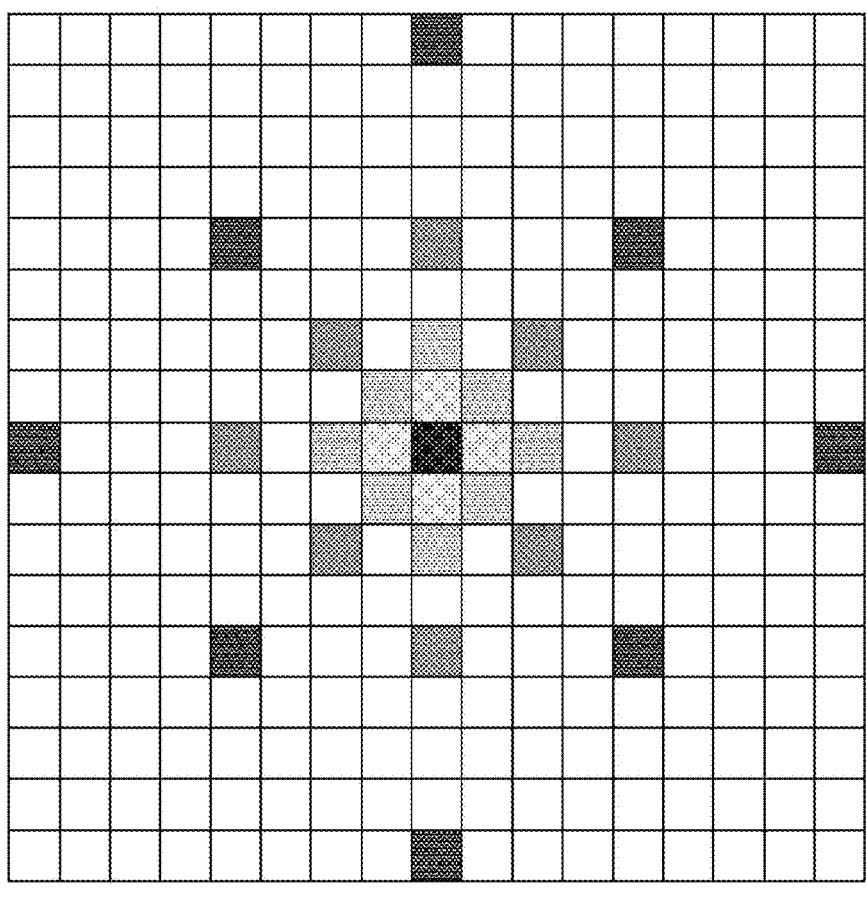
FIG. 21 is a diagram showing conventional block matching.

This search has a narrower search range than the wide search used in conventional block matching as shown in FIG. 21. This is because a motion vector is determined by keeping track of a subject at a high speed of 24×60 FPS to determine the vector, and so the accuracy is excellent at the point of time of the motion vector.

The search is conducted in this way, and the 8×8area at the point of time when a match with the previous frame is found is fed to a high-pass filter (HPF (High Pass Filter) in a HPF unit 28 of FIG. 3.

The HPF unit 28 includes, for example, a horizontal high-pass filter such as −0.25Z^(−2)+0.5Z^(−1)−0.25Z^0, where Z denotes the scan time for 1 pixel. Further, the HPF unit 28 includes a vertical high-pass filter such as −0.25L^(−2)+0.5L^(−1)−0.25L^0, where L denotes the scan time for one line.

In the case of 3TAP as described above, the HPF unit 28 actually uses data for a 10×10 area that is 1 pixel wider at top, bottom, left, and right than the 8×8 area to ensure that high-pass filtering of the 8×8 area is performed accurately.

The high frequency component extracted by the HPF unit 28 is multiplied by (1-1/X) in a multiplication unit 26 of FIG. 3 to obtain FDR. By calculating FDR for every frame and adding, in the addition unit 25, it to NHPF multiplied by 1/X, a cyclic moving average high frequency component is obtained. The moving average high frequency component is added to LPF in an addition unit 27 of FIG. 3. In this way, frame-by-frame, motion compensated moving average values are obtained, and the random noise that is not correlated across frames is reduced.

Embodiment 2

Since an EVS is a special sensor, few types are available in the lineup, and the number of pixels in the EVS and the number of pixels in the RGB sensor may not match. In embodiment 2, the values of the horizontal motion vector and the vertical motion vector described in embodiment 1 are multiplied by a ratio between the effective pixel count of the event sensor and that of the RGB sensor, when there is a difference between the effective pixel counts of the EVS and the RGB sensor.

Given that, for example, the EVS has 1280×720 pixels, the RGB sensor has 1920×1080 pixels, and these represent effective pixels in the same angle of view, for example, the horizontal ratio HPIX Ratio and vertical ratio VPIX Ratio are determined by the following expressions.

$$HPIX\_Ratio = 1920/1280 = 1.5$$
$$VPIX\_Ratio = 1080/720 = 1.5$$

The motion vector estimation unit 34 multiplies the horizontal ratio HPIX Ratio ratio and the vertical ratio VPIX Ratio by the horizontal motion vector HVECT and the vertical motion vector VVECT, respectively, to determine and output a corrected horizontal motion vector HVECT' and a corrected vertical motion vector VVECT'.

$$HVECT' = HVECT \times HPIX\_Ratio \qquad (9)$$
$$VVECT' = VVECT \times VPIX\_Ratio \qquad (10)$$

Embodiment 3

In embodiment 3, a prism is used to arrange an EVS and a RGB sensor so that they are on the same optical axis in embodiment 1 and embodiment 2. The RGB sensor is an example of an image sensor. A sensor that acquires black and white image data may be used instead of the RGB sensor.

Figure 22:
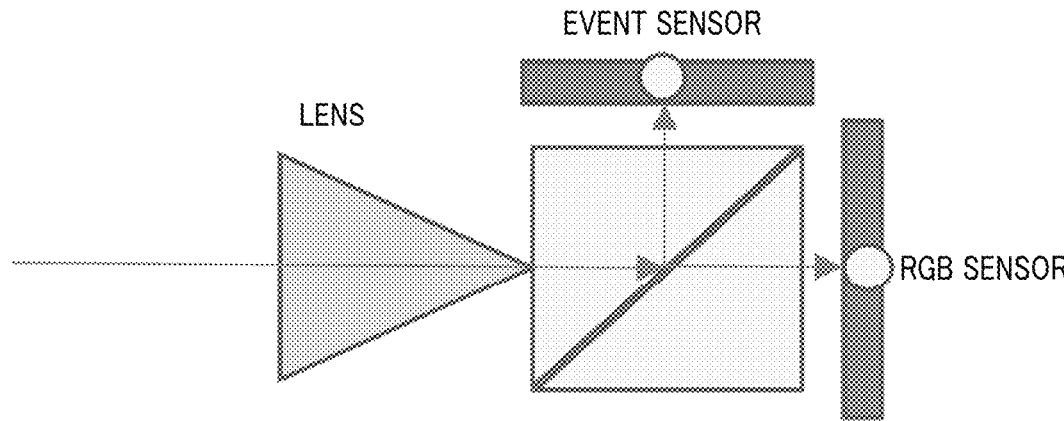
FIG. 22 is a diagram showing an arrangement of an EVS and an RGB sensor using a prism.

FIG. 22 is a diagram showing an arrangement of an EVS and a RGB sensor using a prism. The image light incident from the lens is decomposed by a prism, and the EVS and the RGB sensor are arranged so that the images thereof are on the same optical axis. Using the output data of the RGB sensor and the output data of the EVS obtained in this configuration, the noise reduction process of embodiment 1 or embodiment 2 is performed. The noise reduction process may be performed on each of the R, G, B signals of the RGB sensor, or may be performed on each of the Y, Cb, Cr signals derived from converting R, G, B to Y, Cb, Cr, or may be performed on each of the channels of the signals of a Bayer pattern comprised of R, Gr, Gb, B signals.

Embodiment 4

In embodiment 4, a prism is used to arrange an EVS, a RGB sensor, and a TOF (Time Of Flight) sensor so that they are on the same optical axis in embodiment 1 and embodiment 2. The TOF sensor is an example of a distance sensor.

Figures 23A, 23B:
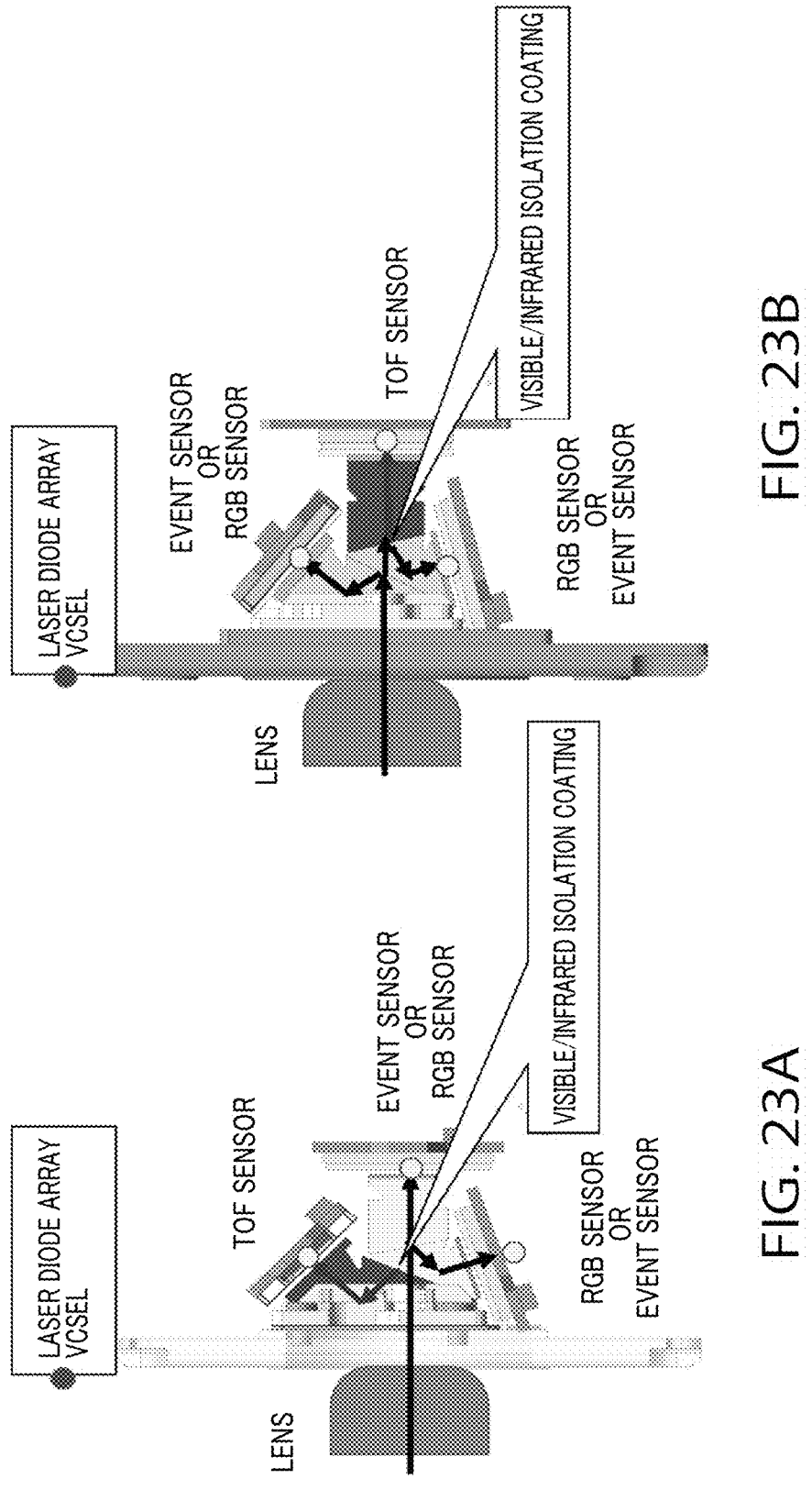
FIGS. 23A and 23B are diagrams showing an arrangement of an EVS, an RGB sensor, and a TOF sensor using a prism.

FIGS. 23A and 23B are diagrams showing an arrangement of an EVS, an RGB sensor, and a TOF sensor using a prism. The lens causes a visible ambient light and a near-infrared light (e.g., an infrared light having a wavelength of 940 nm in this case) emitted by a VCSEL (Vertical Cavity Surface Emitting Laser) of a laser diode array and reflected by a subject to be incident on a prism. For example, the prism decomposes the incident light into a visible light and a near-infrared light with a visible light reflecting dichroic film as shown in FIG. 23 and causes near-infrared light to be incident on the TOF sensor. The visible light is further decomposed by the prism and incident on the RGB sensor and the EVS.

The prism may be structured either in the arrangement of FIG. 23A or the arrangement of FIG. 23B. The RGB sensor, the EVS, and the TOF sensor are arranged on the same optical axis. The TOF sensor has an internal processor and outputs distance data D. The noise reduction process of embodiment 1 or embodiment 2 is performed using the output data of the RGB sensor, the output data of the EVS, and the distance data of the TOF sensor. The noise reduction process may be performed on each of the R, G, B signals of the RGB sensor, or may be performed on each of the Y, Cb, Cr signals derived from converting R, G, B to Y, Cb, Cr, or may be performed on each of the channels of the signals of a Bayer pattern comprised of R, Gr, Gb, B signals. At the same time, the noise reduction of embodiment 1 or embodiment 2 is also performed on the distance data D of the TOF sensor. At this time, the motion vector estimation unit 34 of FIG. 3 may be commonly used in the RGB image and the distance measurement image.

Embodiment 5

Embodiment 5 involves performing, in the arrangement of embodiment 4, noise reduction in the distance data output from the TOF sensor according to frame-to-frame moving averaging using the above motion compensation. In that process, the distance data is not decomposed into low frequency components and high frequency components. Noise reduction is performed in the whole frequency band.

Figure 24:
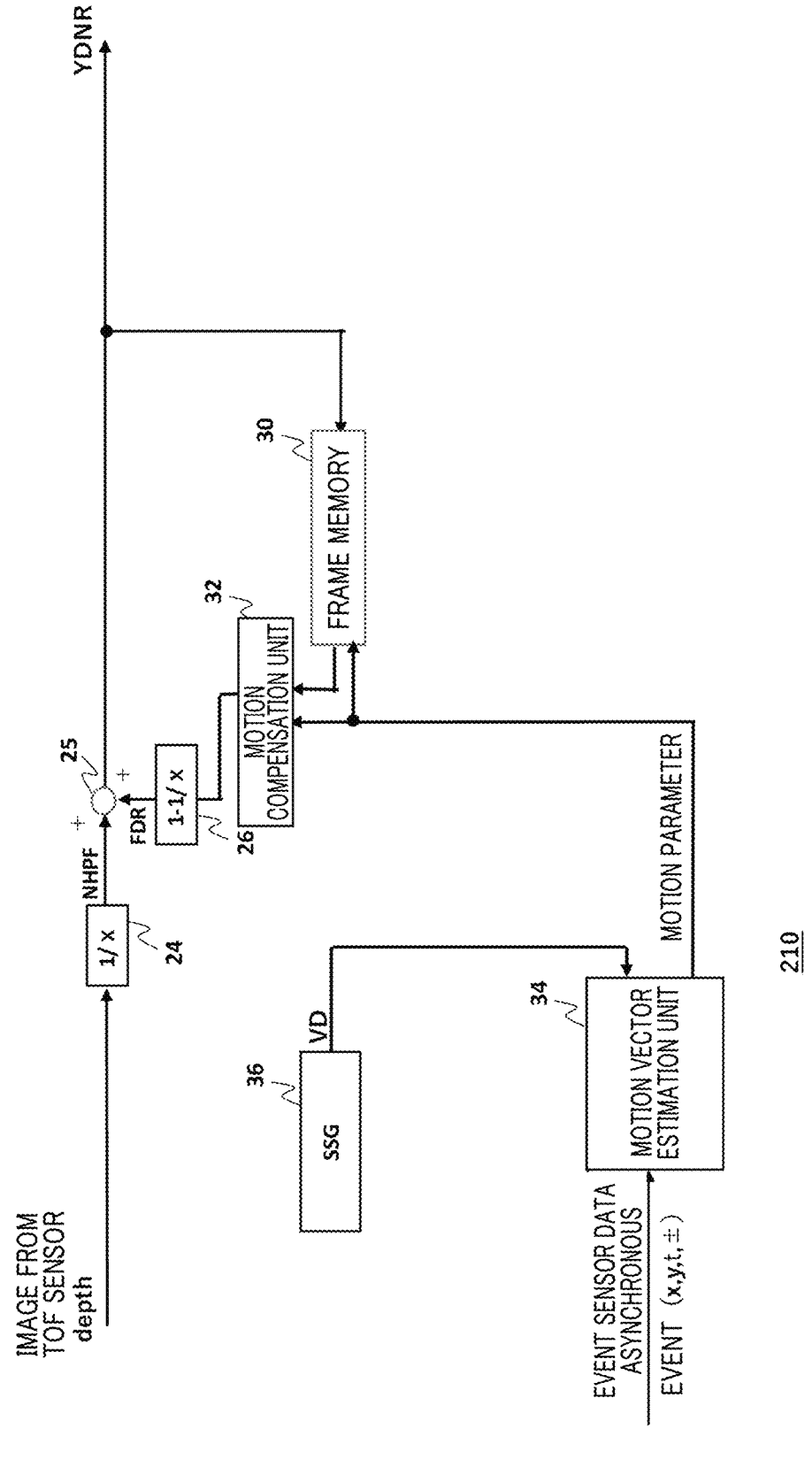
FIG. 24 is a basic block diagram of a moving image noise reduction apparatus of embodiment 5.

FIG. 24 is a block diagram of a moving image noise reduction apparatus 210 of embodiment 5. The configuration for extracting high frequency components and the configuration for adding high frequency components to low frequency components are omitted from the configuration of the moving image noise reduction apparatus 200 of FIG. 3. The other features are as described in embodiment 1.

When the distance image data from the TOF sensor is input to the moving image noise reduction apparatus 210, the data is not decomposed into low frequency components and high frequency components and is divided by the coefficient X in the division unit 24 to obtain NHPF in the entire frequency band. The distance image data in the entire frequency band output from the motion compensation unit 32 that is one frame delayed and motion-compensated is multiplied by (1-1/X) in the multiplication unit 26 to obtain FDR. The addition unit 25 adds NHPF in the entire frequency band multiplied by 1/X and FDR in the entire frequency band multiplied by (1-1/X) and motion compensated. Accordingly, a YDNR signal in the entire frequency band in which the noise is reduced by moving averaging across frames is obtained.

When the distance data of the distance measurement sensor is used for point-cloud 3D modeling, it may be more effective to suppress noise in the low frequency part. Therefore, noise reduction is performed in the entire frequency band without decomposing the data into frequency bands using an LPF and an HPF. The video signal from the RGB sensor, on the other hand, is decomposed into frequency bands as in embodiment 1 to suppress noise in high frequency components. At this time, the motion vector estimation unit 34 of FIG. 3 may be commonly used in the RGB image and the distance measurement image.

The above-described processes in the moving image noise reduction apparatuses 200 and 210 can of course be implemented by hardware-based apparatuses such as a CPU and a memory and can also be implemented by firmware stored in a ROM (read-only memory), a flash memory, etc., or by software on a computer, etc. The firmware program or the software program may be made available on, for example, a computer readable recording medium. Alternatively, the program may be transmitted and received to and from a server via a wired or wireless network. Still alternatively, the program may be transmitted and received in the form of data broadcast over terrestrial or satellite digital broadcast systems.

The moving image noise reduction apparatuses 200 and 210 are advantageous in that the performance of tracking a moving subject can be improved, and the range of block matching does not need to be expanded, by calculating a motion vector with a high frame rate using an EVS and then performing block matching. In addition, the EVS does not have the concept of a shutter, and the EVS has a wide dynamic range from dark to light. Therefore, the tracking performance is good even in the case of dark subjects.

In addition, motion can be estimated using two types of (bright and dark) one-bit signals for pixels with a brightness change. Accordingly, the calculation speed is improved and high-speed data update is possible. This also improves the performance of tracking moving objects and reduces the search range between frames. As a result, the accuracy of noise reduction in the presence of moving objects is improved, and afterimage between frames is suppressed. Therefore, high-quality video and ranging data can be obtained, and the circuit scale and processing time of the apparatus as a whole can be reduced.

Given above is a description of the present disclosure based on the embodiments. The embodiments are intended to be illustrative only and it will be understood by those skilled in the art that various modifications to combinations of constituting elements and processes are possible and that such modifications are also within the scope of the present disclosure.

What is claimed is:

1. A moving image noise reduction apparatus comprising:
   a filter unit that decomposes image data from an image sensor adapted to capture images at a predetermined frame rate into a low-frequency component and a first high-frequency component;
   a motion vector estimation unit that reads data from an event sensor, adapted to asynchronously output information on a pixel in which a brightness changes, at a frame rate higher than the predetermined frame rate and estimates a motion vector; and
   a motion compensation unit that performs motion compensation based on the motion vector,
   wherein the filter unit generates a third high-frequency component by adding the first high-frequency component and a second high-frequency component extracted from an image obtained by motion compensation at a predetermined ratio, and reduces a noise in the image data by adding the low-frequency component and the third high-frequency component.

2. The moving image noise reduction apparatus according to claim 1,
   wherein a block range in the image data in which a motion vector is estimated is larger than a block range in the image data in which motion compensation is performed.

3. The moving image noise reduction apparatus according to claim 1,
   wherein, when the motion vector is estimated, a timing to start calculating the motion vector is changed according to a shutter speed of the image sensor.

4. The moving image noise reduction apparatus according to claim 1,
   wherein the filter unit reduces, when reducing a noise in distance measurement image data from a distance sensor adapted to detect a distance to a subject, a noise in the distance measurement image data by adding a distance measurement image in an entire frequency band from the distance sensor and a distance measurement image in the entire frequency band obtained by motion compensation at a predetermined ratio without decomposing the distance measurement image data into a low-frequency component and a high-frequency component.

5. A moving image noise reduction method comprising:
filtering image data from an image sensor adapted to capture images at a predetermined frame rate into a low-frequency component and a first high-frequency component;

reading data from an event sensor, adapted to asynchronously output information on a pixel in which a brightness changes, at a frame rate higher than the predetermined frame rate and estimating a motion vector; and performing motion compensation based on the motion vector, wherein the filtering generates a third high-frequency component by adding the first high-frequency component to a second high-frequency component extracted from an image obtained by motion compensation at a predetermined ratio, and reduces a noise in the image data by adding the low-frequency component and the third high-frequency component.

* * * * *